US010065520B2

(12) United States Patent
Zhang et al.

(10) Patent No.: US 10,065,520 B2
(45) Date of Patent: Sep. 4, 2018

(54) SYSTEM FOR OPTIMIZING ELECTRICITY USE FROM AN ELECTRIC GRID AND RELATED METHOD

(71) Applicant: The Regents of the University of California, Oakland, CA (US)

(72) Inventors: Li Zhang, Irvine, CA (US); Faryar Jabbari, Irvine, CA (US); Scott Samuelsen, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 237 days.

(21) Appl. No.: 14/745,293

(22) Filed: Jun. 19, 2015

(65) Prior Publication Data

US 2016/0009192 A1    Jan. 14, 2016

Related U.S. Application Data

(60) Provisional application No. 62/023,754, filed on Jul. 11, 2014.

(51) Int. Cl.
*G05B 13/02* (2006.01)
*H02J 3/14* (2006.01)
*B60L 11/18* (2006.01)
*G06Q 50/06* (2012.01)
*G06Q 20/14* (2012.01)
*G07F 15/00* (2006.01)

(52) U.S. Cl.
CPC ......... *B60L 11/1848* (2013.01); *B60L 11/184* (2013.01); *G06Q 20/145* (2013.01); *G06Q 50/06* (2013.01); *G07F 15/005* (2013.01);

*Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .................................................. B60L 11/1848
USPC ........................................................ 320/109
See application file for complete search history.

(56) References Cited

U.S. PATENT DOCUMENTS

| | | | | |
|---|---|---|---|---|
| 7,821,156 B2* | 10/2010 | Katz | .......................... | H02J 3/14 |
| | | | | 307/35 |
| 8,862,279 B2* | 10/2014 | Darden, II | ........... | G06Q 10/063 |
| | | | | 700/291 |
| 9,424,613 B2* | 8/2016 | Hou | ........................ | G06Q 50/06 |
| 9,513,648 B2* | 12/2016 | Forbes, Jr. | ............. | G05B 19/02 |
| 9,563,924 B2* | 2/2017 | Ghosh | .................... | G06Q 50/06 |

(Continued)

*Primary Examiner* — Drew A Dunn
*Assistant Examiner* — Jerry D Robbins
(74) *Attorney, Agent, or Firm* — Farjami & Farjami LLP

(57) ABSTRACT

A method of optimizing electricity use from an electric grid is disclosed. The method includes formulating a target load using a cost function for the electric grid, broadcasting a cost signal to the electric device based on the target load, receiving a charging profile from the electric device based on the cost signal, aggregating a demand profile for the electricity use based on the charging profile, determining an updated cost signal based on the demand profile, and broadcasting the updated cost signal to another electric device. The electric device is chargeable electric device, such as a plug-in electric vehicle (PEV). The electric device determines the charging profile only once based on the cost signal, and is charged at maximum power.

20 Claims, 19 Drawing Sheets

(56) References Cited

U.S. PATENT DOCUMENTS

| | | | | |
|---|---|---|---|---|
| 2008/0039989 A1* | 2/2008 | Pollack | ............... | B60L 11/1811 |
| | | | | 701/22 |
| 2011/0178643 A1* | 7/2011 | Metcalfe | ............. | F24D 19/1006 |
| | | | | 700/276 |
| 2013/0184886 A1* | 7/2013 | Pollack | .................. | G05D 11/00 |
| | | | | 700/291 |
| 2013/0274936 A1* | 10/2013 | Donahue | ................ | G06Q 50/06 |
| | | | | 700/291 |
| 2015/0380936 A1* | 12/2015 | Frolik | ....................... | H02J 3/14 |
| | | | | 307/112 |

\* cited by examiner

1400

SYSTEM FOR OPTIMIZING ELECTRICITY USE FROM AN ELECTRIC GRID AND RELATED METHOD

The present application claims the benefit of and priority to a provisional patent application entitled "Coordinating Plug-in Electric Vehicle Charging with Electric Grid," Ser. No. 62/023,754 filed on Jul. 11, 2014. The disclosure in this provisional application is hereby incorporated fully by reference into the present application.

STATEMENT OF GOVERNMENT INTEREST

This invention was made with Government support under Contract No. N660001-1-2-4041, awarded by the DARPA. The Government has certain rights in this invention.

BACKGROUND

Plug-in electric vehicles (PEVs), such as plug-in hybrid electric vehicles (PHEVs) and battery electric vehicles (BEVs), have drawn interest from state and local governments, automakers, and the general public due to the potential to reduce fossil fuel consumption, tailpipe emissions, overall greenhouse gas emissions, and operating cost. For example, the California Advanced Clean Cars program mandates 1.4 million zero-emission and PHEVs in California by 2025. Although, there has been great research efforts in evaluating PEV benefits quantitatively, one of the obstacles for large deployment and/or acceptance of PEVs is the shortage of charging infrastructure or electric vehicle supply equipment (EVSE) and corresponding charging protocols. The state and local governments, as well as automakers, have shown interest in building a sufficient charging network.

Charging PEVs can increase the electric demand and can have a major impact on the electricity demand curve, as PEV penetration becomes significant. The power requirement of a large number of PEVs at peak or near peak times can lead to significant challenges in cost, delivery through electric grid, and even in generation and ramping capacities. Generally, it is desirable to have the electricity demand and generation of the grid balanced at all times to assure operational stability. Renewable energy generation, such as wind and solar energy generation, may be taken into consideration as negative demand since the power cannot be controlled in the same way as other forms of generation. Thus, the net load, total demand minus renewable generation, may be targeted to be flat or at least slowly varying. A substantially constant (or flat) demand curve is considered beneficial for cost and environmental consideration.

Previous work on analysis of the allocation of charging infrastructure has shown that with large PEV penetration, even with a reliable charging network, the majority of the charging activities occur at home with the current PEV characteristics and charging rates, due to the cheap night time residential electricity and the long dwelling time needed. Unlike daytime charging, overnight charging can be flexible and can be managed so that, aggregated with overall demand, it can result in lower generation cost and emissions. Furthermore, charging time strategy has been shown to have the most significant impact on charging cost reduction and overall grid operation.

Generally, the main goal is to schedule and shift the charging demand of the PEVs to the late evening and very early morning when the overall demand is the lowest. Valley filling is aimed at leveling the overall demand to reduce the need for shutting down and restarting of large power plants. In addition, costs associated with ramping and other factors may be considered when finding an optimal solution for charging cost reduction and efficient overall grid operation.

Several techniques have been developed to solve the global valley filling problem through a decentralized and iterative approach. One technique requires the total number of PEVs be available for participation in the iterations needed in the optimization. Such an iterative approach may require significant communication if the number of vehicles becomes large. More crucially, these techniques do not ensure each PEV is charging at the maximum charging rate. Another technique attempts to address the last concern by relying on a stochastic approach in which the start of the charging period is the decision variable in the optimization problem, given the charging rate and state of charge (SOC)—which yields the charging duration. Under mild assumptions, the iterative algorithm converges with probability one. Yet, there are other techniques suggesting decentralized charging controls for PHEV to avoid transformer overloading, but cannot fill the overnight demand valley.

Thus, there is a need in the art for a method of coordinating plug-in electric vehicle charging with electric grid, that can minimize the amount of communication needed between the PEVs and the grid operator and does not require availability of all PEVs for initiating charging time assignments. Moreover, the method of coordinating PEV charging with electric grid can be modified to obtain a charging pattern so that a final net load curve follows a target load curve, for example, to achieve valley filling or ramp rate reduction.

SUMMARY

The present disclosure is directed to a system for optimizing electricity use from an electric grid and related method, substantially as shown in and/or described in connection with at least one of the figures, and as set forth in the claims.

DETAILED DESCRIPTION

Figure 1:
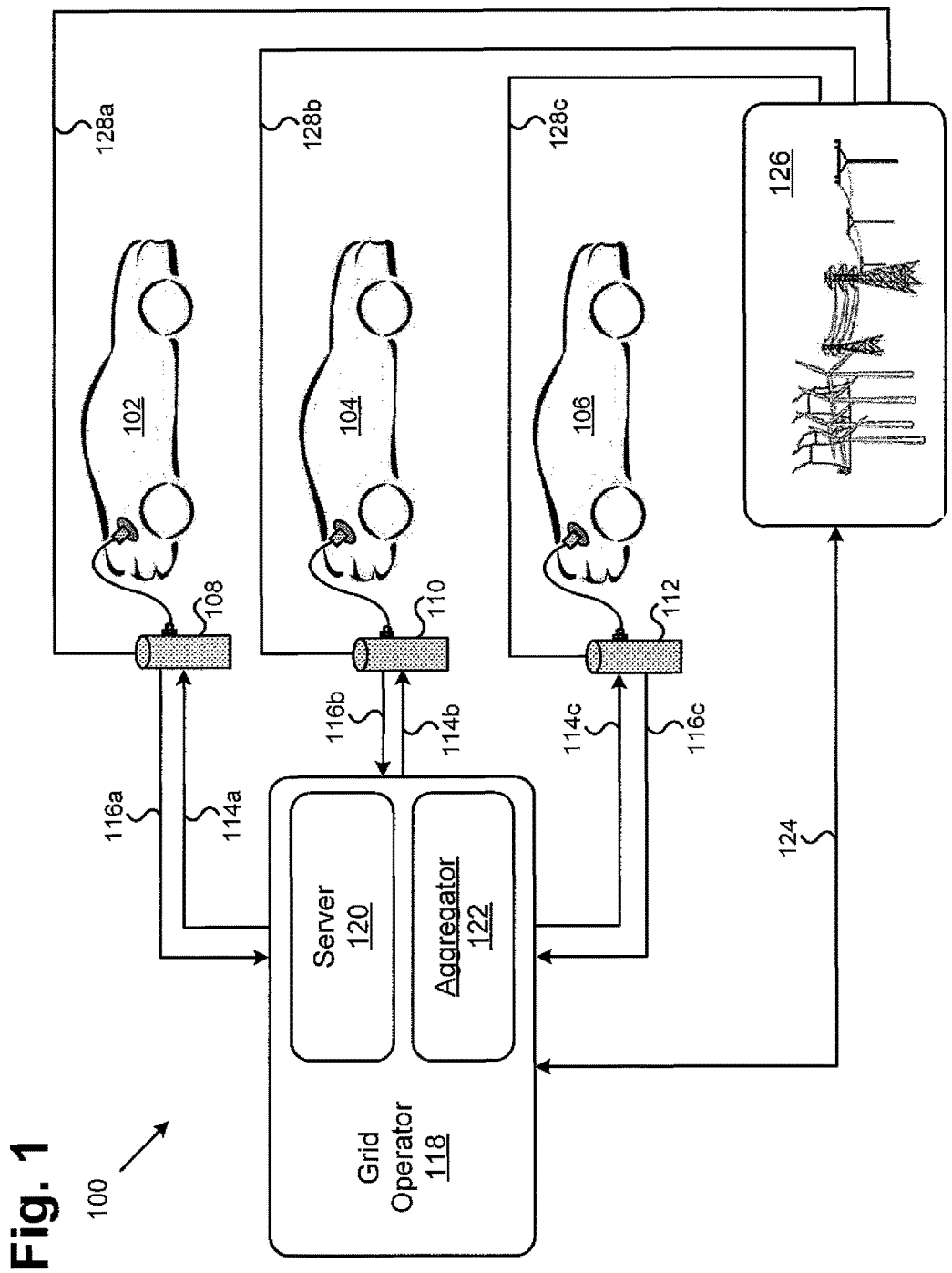
FIG. 1 illustrates an exemplary system for optimizing electricity use from an electric grid, according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates an exemplary system of optimizing electricity use from an electric grid, according to one implementation of the present application. As illustrated in FIG. 1, exemplary system 100 for optimizing electricity use from an electric grid includes electric devices 102, 104 and 106, charging stations 108, 110 and 112, grid operator 118 having server 120 and aggregator 122, electric grid 126. In the present implementation, electric devices 102, 104 and 106 may each be a chargeable electric device, such as a plug-in electric vehicle (PEV). Charging stations 108, 110 and 112 may be residential or commercial charging stations, which are connected to electric grid 126. Also, each of charging stations 108, 110 and 112 may be connected to grid operator 118 for receiving a cost signal from grid operator 118 and sending a charging profile to grid operator 118. Grid operator 118 is connected to electric grid 126 to receive information such as a grid level net load of electricity use (i.e., a demand profile) from electric grid 126. Grid operator 118 is configured to formulate a target load using a cost function for the electric grid, based on the interests of grid operator 118, for example, to achieve a desired profile for the net power (e.g., a target load). Grid operator 118 is also configured to broadcast a cost signal to one or more electric devices 102, 104 and 106 based on the target load, update the cost signal, and control the charging of electric devices 102, 104 and 106.

For example, once electric device 102 is plugged into charging station 108, electric device 102 may receive cost signal 114a from grid operator 118 based on the interests of grid operator 118, for example, to achieve a desired profile for the net power (e.g., a target load). The interests of grid operator 118 may be a grid-wide valley filling or a grid-wide ramp rate deduction target, for example. Based on cost signal 114a, electric device 102 may determine charging profile 116a to minimize its charging cost by considering factors such as total charging energy, charging power and available charging time. Upon receiving charging profile 116a from electric device 102 using server 120, grid operator 118 may aggregate charging profile 116a using aggregator 122 to the demand profile to reflect a total forecasted net load of electricity use. Based on charging profile 116a, grid operator 118 may control electric grid 126 to provide energy 128a to charge electric device 102.

As illustrated in FIG. 1, in system 100, electric device 104 may be plugged into charging station 110 at the same time as or at a different time from the time at which electric device 102 is plugged into charging station 108. Once electric device 104 is plugged into charging station 110, electric device 104 may receive cost signal 114b from grid operator 118 based on the desired profile for the net power. Cost signal 114b may be the same as or different from cost signal 114a, depending on whether cost signal 114a has been updated, for example, by grid operator 118. Based on cost signal 114b, electric device 104 may determine charging profile 116b to minimize its charging cost by considering factors such as total charging energy, charging power and available charging time. Upon receiving charging profile 116b from electric device 104 using server 120, grid operator 118 may aggregate charging profile 116b using aggregator 122 to the demand profile to reflect a total forecasted net load of electricity use. Based on charging profile 116b, grid operator 118 may control electric grid 126 to provide energy 128b to charge electric device 104.

Similarly, in system 100, electric device 106 may be plugged into charging station 112 at the same time as or at a different time from the times at which electric devices 102 and 104 are plugged into charging stations 108 and 110, respectively. Once electric device 106 is plugged into charging station 112, electric device 106 may receive cost signal 114c from grid operator 118 based on the desired profile for the net power. Cost signal 114c may be the same as or different from cost signals 114a and/or 114b, depending on whether cost signal 114a and/or 114c have been updated, for example, by grid operator 118. Based on cost signal 114c, electric device 106 may determine charging profile 116c to minimize its charging cost by considering factors such as total charging energy, charging power and available charging time. Upon receiving charging profile 116c from electric device 106 using server 120, grid operator 118 may aggregate charging profile 116c using aggregator 122 to the demand profile to reflect a total forecasted net load of electricity use. Based on charging profile 116c, grid operator 118 may control electric grid 126 to provide energy 128c to charge electric device 106.

Figure 2:
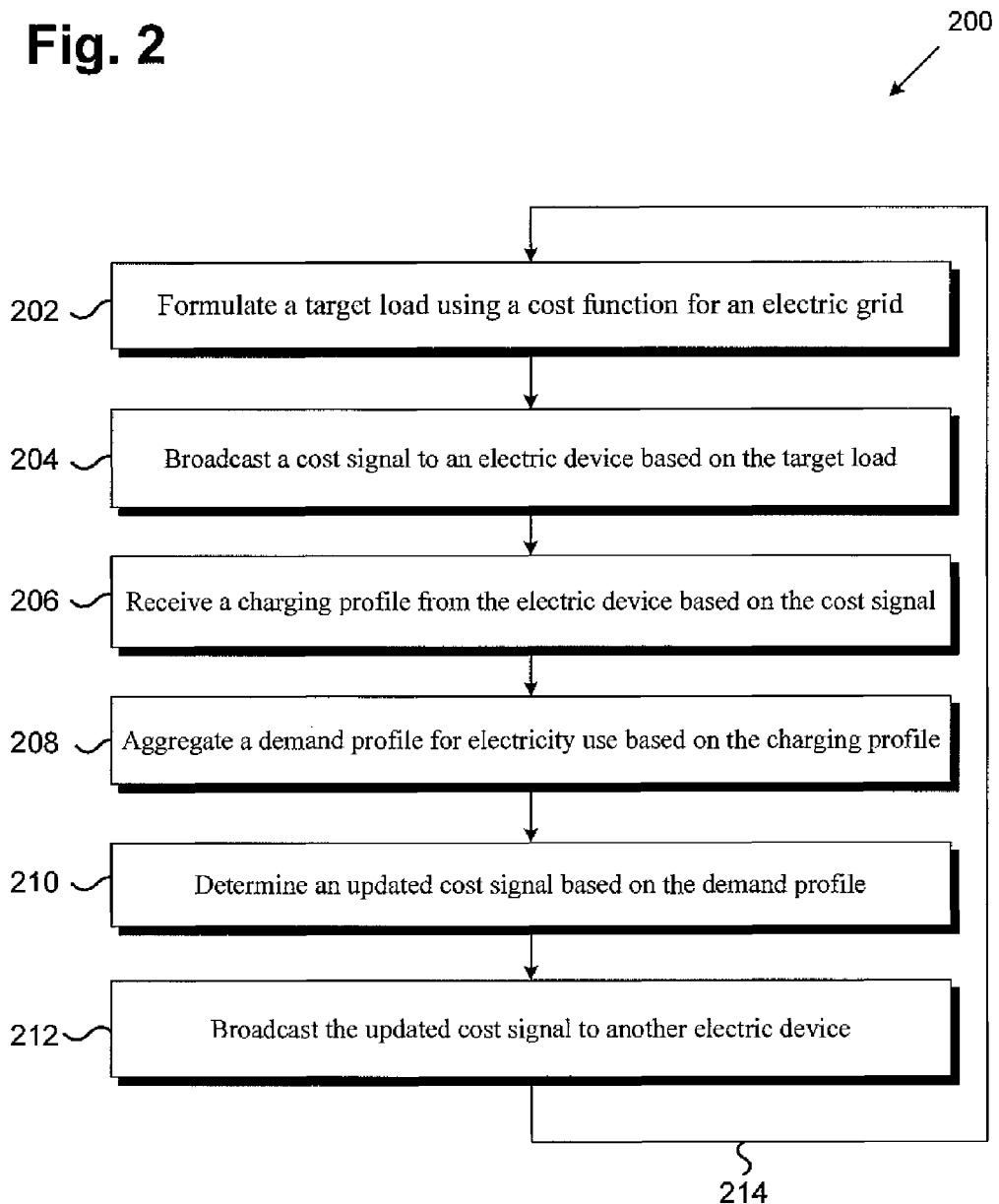
FIG. 2 illustrates a flowchart illustrating an exemplary method of optimizing electricity use from an electric grid, according to one implementation of the present application.

FIG. 2 shows a flowchart illustrating an exemplary method of optimizing electricity use from an electric grid, according to one implementation of the present application. Certain details and features have been left out of flowchart 200 that are apparent to a person of ordinary skill in the art. For example, an action may consist of one or more subactions or may involve specialized equipment or materials, as known in the art. Actions 202 through 214 indicated in flowchart 200 are sufficient to describe one implementation of the present inventive concepts, other implementations of the present inventive concepts may utilize actions different from those shown in flowchart 200.

In flowchart 200, action 202 includes formulating a target load using a cost function for an electric grid, based on the interests of a grid operator, for example, to achieve a desired profile for the net power. The interests of the grid operator may be a grid-wide valley filling or a grid-wide ramp rate deduction target, for example. Action 204 includes broadcasting a cost signal to an electric device based on the target load. Action 206 includes receiving a charging profile from the electric device based on the cost signal. Action 208 includes aggregating a demand profile to reflect a total forecasted net load of electricity use based on the charging profile. Action 210 includes determining an updated cost signal based on the demand profile. Action 212 includes broadcast the updated cost signal to another electric device. Action 214 includes repeating actions 202 through 212 over time, for example as more electric devices are plugged in. However, it should be understood that action 214 may be an optional step.

According to implementations of the present application, a target load may be any desirable net load (with or without renewable energy generation), for example, for grid level valley filling as discussed in Section 2, for prioritized grid level valley filling as discussed in Section 4.2.1., and for ramp rate reducing as discussed in Section 4.2.2. Depending on the specific interests of the grid operator, a target load may be formulated by using a cost function, for example, as discussed with reference to Equations (5), (8), and (15) below.

Moreover, according to implementations of the present application, one or more cost signals are sent to individual PEVs. According to their arriving times, the cost signal sent to one PEV may be different from the cost signal sent to another PEV plugged in at a different time. Each PEV can locally calculate the best charging profile for itself based on the cost signal received from the grid operator. When the grid operator receives the charging profiles from the PEVs, an aggregator of the grid operator aggregates the charging profiles to a demand profile to reflect a total forecasted net load of electricity use. Based on the demand profile, the grid operator may update the cost signal periodically, and broadcast the updated cost signal to the next group of PEVs.

In the present implementation, the cost signal, depending on the time resolution (e.g., ¼ hour, ½ hour, and one hour), is a vector of 24-96 bits or points, for example based on the interests of the grid operator. Also, the charging profile may include a vector of 24-96 bits or points containing information of the charging power at each time point, for example. This way, by sending the charging profile to the grid operator, the PEV can register the optimal time slots and power needed for charging the PEV with the grid operator. The grid operator can aggregate the charging profiles to the demand profile to reflect the total forecasted net load of electricity use. Based on the demand profile, the cost signal may be periodically updated to provide updated cost signals broadcast to subsequently registered PEVs.

The following shows an exemplary system and method of optimizing electricity use from an electric grid, according to one implementation of the present application.

1. INTRODUCTION

Notation

Some of the symbols used in the present application are listed as follows.

$t_i$ Time slot i in the 48-hour window, e.g., 12 am-1 am, 1 am-2 am, . . . , 11 pm-12 am
i Time slot number, e.g., 1, 2, . . . , 48
$\Delta t$ Time slot duration, e.g. 60 minutes (1 hour)
$\Delta t_n(t_i)$ Plugged in time in time slot i for vehicle n, known
n PEV number
$ta_n$ Home arrival time after the last trip for PEV n
$E(t_i)$ Electric demand
$D(t_i)$ Electric net load
$x_n(t_i)$ Charging energy at each time slot for vehicle n, decision variable
$r_n(t_i)$ Maximum charging energy at each time slot for vehicle n, known
$L(t_i)$ Final load with PEVs charging
$T_k$ Time when cost is updated
$V_k$ Vehicle number when cost updated
$T_{step}$ Time interval for cost function updating
$V_{step}$ Vehicle number interval for cost function updating
k $k^{th}$ step to update cost function
$s_k(t_i)$ Aggregated charging profile for step k
$C_k(t_i)$ Cost function for charging at step k
$R(t_i)$ Maximum overall charging power at each time slot, known
$X(t_i)$ Overall charging load at each time slot, decision variable
$TL(t_i)$ Target load
$TC_k(t_i)$ Cost function for charging at step k with target load 1.1. National Household Travel Survey (NHTS)

The vehicle travel behavior data used in the present application are derived from the 2009 National Household Travel Survey (NETS) by Federal Highway Administration the U.S. Department of Transportation, the contents of which are hereby incorporated fully by reference into the present application. In particular, data for California were selected, trips occurring without a personally owned vehicle were deleted, person-chain data were converted to vehicle-chain data, daily trips data with unlinked destinations or significant over-speed were deleted, and tours were organized into home based daily tours (first trip from home, last trip to home). A total of 20,295 vehicles were selected covering 83,005 single trips, with an average of 7.85 miles per trip and 32.13 miles per vehicle, per day.

Figure 3:
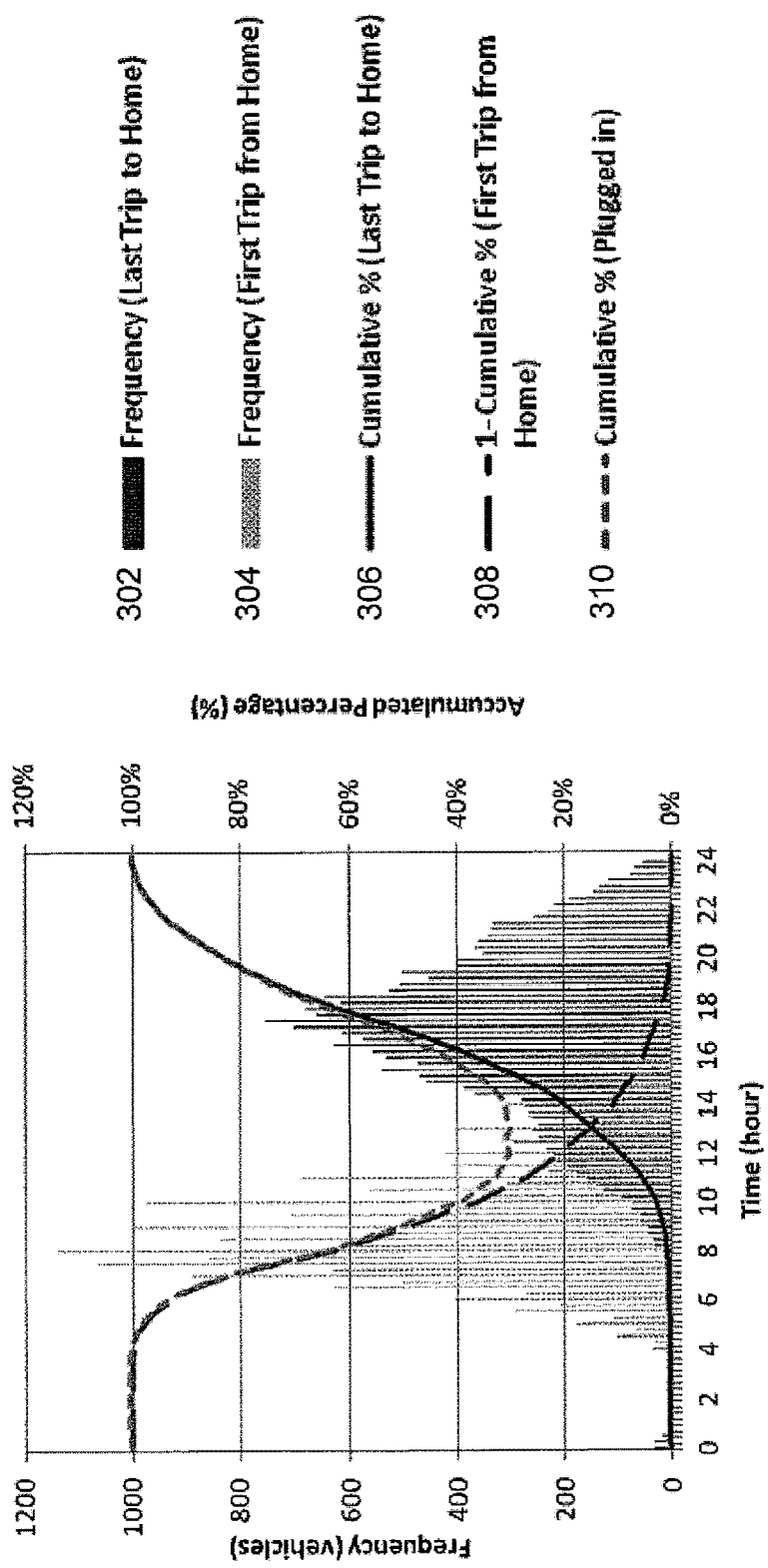
FIG. 3 illustrates vehicles home departure and arrival time distribution and charging availability according to the 2009 National Household Travel Survey.

FIG. 3 illustrates vehicles home departure and arrival time distribution and charging availability according to the 2009 NHTS. In particular, FIG. 3 shows histogram 302 of the last home arrival time of the day (e.g., frequency of last trip to home), with 15 minutes (0.25 hour) intervals for all 20,295 vehicles. As can be seen in FIG. 3, the peak arrivals occur in the late afternoon with almost 800 vehicles for the data set, which is around 4% of the total vehicles for this interval (around 17:00). Curve 306 (e.g. cumulative % of last trip to home) shows by 20:00, 80% of the vehicles have arrived and will stay until the next morning.

FIG. 3 also shows histogram 304 indicating when the vehicles leave home for the first trip of the day (e.g., frequency of first trip from home), with 15 minutes (0.25 hour) intervals for all 20,295 vehicles. As can be seen in histogram 304, the peak occurs in the early morning at around 7:00. Curve 308 (e.g. cumulative % of first trip from home) shows by 7:00, 80% of the vehicles have not left. Combined with the arrival time, as shown in curve 310 (e.g., cumulative % of plugged in), 80% of the vehicles can be coordinated with electric grid at home for almost half of the day, from 20:00 to 7:00 in the next day. Thus, this time period may be considered to be the most effective coordinating window between PEVs and electric grid.

1.2. Vehicle Information

The present application focuses, in part, on the grid impact of macro scale of vehicle behavior, where a parameterized vehicle operation and charging model were used. Table 1 shows vehicle parameters used in the present application, which were derived from current production vehicles. Gasoline price is assumed to be high enough throughout in the present application to ensure PHEVs use electricity first rather than gasoline. By way of example only, the present implementation uses a 10% penetration of all passenger cars (PC) and light duty trucks (around 2.1 million PEVs in California). Thus, the scaling factor from NHTS data to more than 2 million PEVs may be around 100.

TABLE 1

Simulation parameters for PHEVs and BEVs.

| Vehicle type | MPG | kWh/mi(DC) | All-electric range(miles) | Efficiency from Grid to Battery | AC charging power (kW) |
|---|---|---|---|---|---|
| PHEVs | 40 | 0.34 | 40 | 0.85 | 3.3 |
| BEVs | N/A | 0.31 | 60 | 0.85 | 3.3 |

1.3. Renewables and Net Load

The electricity sector in many countries and states have targets for meeting increasing fractions of their load demand with renewable resources to promote a shift towards a low-carbon, low-pollutant emission grid mix. In California, the target is to provide 33% of all retail sales of electricity from renewable resources by the year 2020. Other states in the U.S. also aim to reach similar goals to some extent.

Figure 4A:
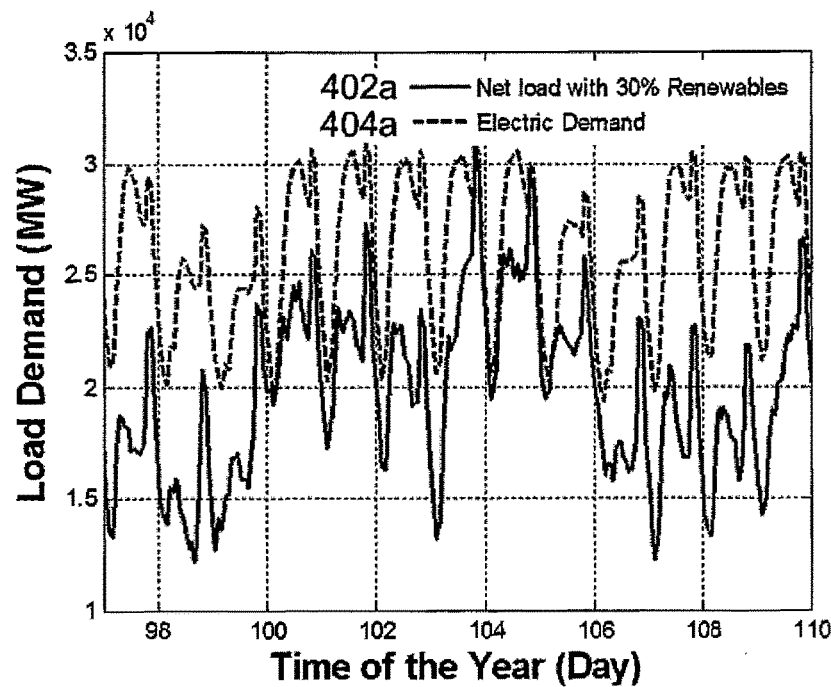
FIG. 4A illustrates a net load curve with 30% renewable penetration and an electric demand curve on an hourly resolved basis.
Figure 4B:
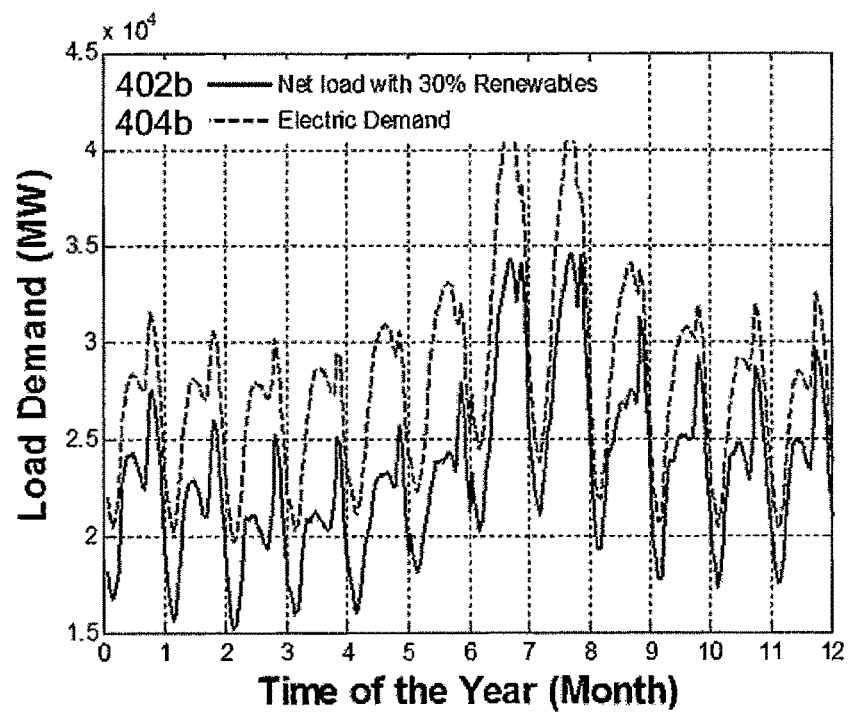
FIG. 4B illustrates a net load curve with 30% renewable penetration and an electric demand curve on a monthly average basis.

FIG. 4A illustrates a net load curve with 30% renewable penetration and an electric demand curve on an hourly resolved basis. FIG. 4A shows curve 402a (e.g., electric net load, $D(t_i)$, based on wind and solar installed capacities at around 30% renewable penetration) and curve 404a (e.g., electric demand, $E(t_i)$) on an hourly resolved basis. FIG. 4B illustrates a net load curve with 30% renewable penetration and an electric demand curve on a monthly average basis. FIG. 4B shows curve 402b (e.g., electric net load, $D(t_i)$, based on wind and solar installed capacities at around 30% renewable penetration) and curve 404b (e.g., electric demand, $E(t_i)$) on a monthly average basis.

As illustrated in FIG. 4A, curve 404a has a diurnal pattern with a valley hours after midnight. The same pattern also can be observed in curve 402a for most of the days. However, as shown from day 98 to 99 and day 108 to 109 in FIG. 4A, additional large peaks and valleys may also exist, in particular the relatively large valley in the afternoon. It is desirable that the aggregated PEV charging profile can be used to smooth this curve as much as possible so the final load is met with lower cost and/or emissions. As illustrated in FIG. 4B, curve 402b and curve 404b show similar patterns as curve 402a and curve 404a, respectively, in FIG. 4A. FIGS. 4A and 4B are used to make predictions of the electric or power demand.

As discussed below, in one implementation of the present application, the optimization of valley filling from the electric grid perspective is first introduced as a target load for the electric grid to provide a reference solution. It introduces the mechanism of optimal charging from the perspective of each individual PEV as well as the protocol to update the cost signal broadcast by the grid operator to achieve the optimality at the grid scale. Additionally, the year-long results are shown and compared to the original net load and the results from grid level valley filling. Finally, a modified protocol is introduced for the final net load to substantially follow a pre-defined target load, different from the target load for valley filling, for example, to achieve prioritized secondary valley filling or ramp rate reduction.

2. GRID LEVEL VALLEY FILLING

As discussed above, the electric grid may favor certain types of load curves, independent of the behavior of individual PEVs. Valley filling is thus a strong preference, in which ideal valley filling is to solve a convex optimization problem with the constraints on total energy consumption of PEVs.

The optimization details can be formatted as follows.

$$\min \sum_i (D(t_i) + X(t_i))^2 \quad (1)$$

subject to $$\Delta t \times \sum_i X(t_i) = B = \sum_n b_n \quad (2)$$

where $X(t_i)$ is the overall charging power at each time slot $t_i$, and B is the total charging energy of all PEVs for a whole day, which is considered to be known, which the summation of the charging energy $b_n$ for individual PEV.

A solution to this problem is well known as the following $$X(t_i) = (\lambda - D(t_i))^+ = \max\{(\lambda - D(t_i)), 0\} \quad (3)$$
$$\sum_i (\lambda - D(t_i))^+ = B$$

where $\lambda$ is the height to which that the valley is filled.

However, unless all vehicles are plugged in for the whole time horizon, this solution ignores an important constraint associated with the overall charging power: the ideal valley filling result is not feasible if there are not enough PEVs plugged-in for a specific time slot according to the PEV charging availability shown in FIG. 3. FIG. 3 is used to derive an additional constraint shown in Equation (4) to provide an upper bound on the overall charging power, depicted by curve 514 in FIG. 5. Essentially, $R(t_i)$ is the product of the amount of plugged in PEVs and the individual charging power (e.g., 3.3 kW). This constraint is independent from the electric load curve and can be derived from historical plug-in and plug-out data. In contrast to the ideal valley filling without a power limit, the combination of Equations (1), (2) and (4) can be defined as constrained valley filling.

$$X(t_i) \leq R(t_i) \quad (4)$$

Figure 5:
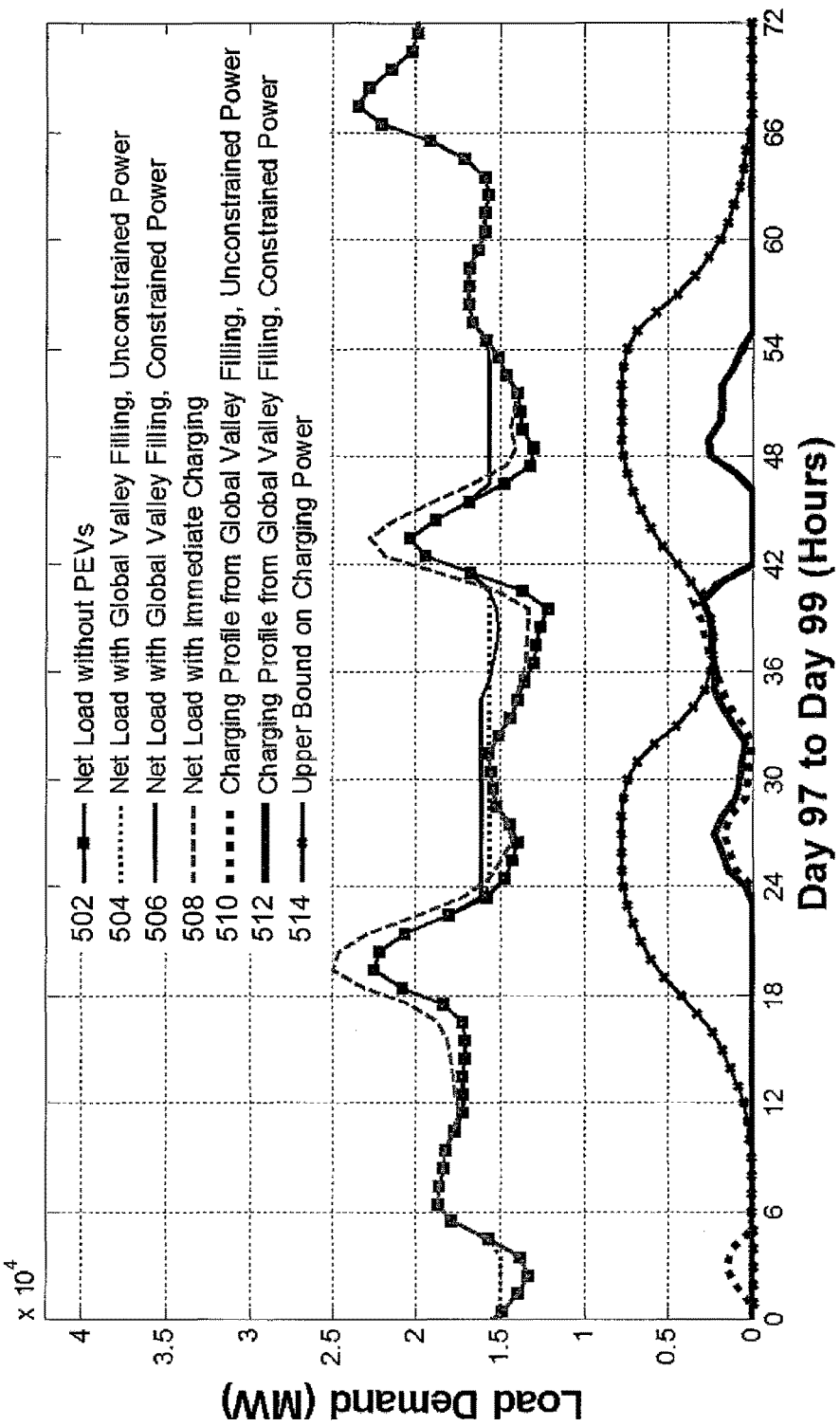
FIG. 5 illustrates comparisons of global valley filling with and without power constraint, and non-PEV charge and total charge with immediate charging.

FIG. 5 illustrates comparisons of global valley filling with and without power constraint, and non-PEV charge and total charge with immediate charging. For example, the optimal solutions for both cases on the net loads from day 97 to day 99 (hour 0 to hour 72) are shown in FIG. 5. It is assumed that only the PEVs that arrive in days 97 and 98 count. Day 98 is not a typical day since the largest valley does not occur overnight but in the early afternoon (at hour 39 on the graph). Curve 502 shows net load without PEVs charging. Curve 504 shows net load with global valley filling without power constraint. Curve 506 shows net load with global valley filling with power constraint. Curve 508 shows net load with immediate charging. Curve 510 shows total PEV charging profile from global valley filling without power constraint. Curve 512 shows total PEV charging profile from global valley filling with power constraint. Curve 514 shows upper bound on charging power.

The ideal valley filling result, curve 504, requires more vehicles than are actually plugged in between hours 36-40 (i.e. arrived and plugged in). For another period from hour 1 to hour 4 in FIG. 5, when there is not a single PEV since no vehicle has arrived, the ideal valley filling draws power from the grid as well. When the inequality constraint in Equation (4) which is represented by curve 514 at the bottom of the figure is used, no power flows to PEVs before hour 6. The deepest valley from hour 36 to hour 42 ends up being filled only partially, as shown by curve 506. Although the situation of having the deepest valley in the afternoon may not happen often, it underlines the point that the ability of PEVs to alter electric load significantly may be somewhat limited to the overnight period. Although Equation (4), as a constraint, considers PEV availability, it is most restrictive in the early afternoon periods. During late night periods, with some of the PEVs fully charged, the real available PEV number becomes smaller than that of plugged in PEVs. Thus, during these periods, Equation (4) overestimates the limit and is not a restrictive constraint. FIG. 5 also shows the result from the immediate charging as a benchmark, depicted by curve 508. It increases the peaking load by 2 GW for day 97 and day 98, indicating the necessity of the coordinated charging control, such as the valley filling approach.

Naturally, a perfect valley filling solution from Equations (1), (2), and (4) may not be difficult to achieve depending on the specific shape of the net load, the availability of the PEVs, and the individual level charge needs. A complete global valley filling solution would require a problem with decision variables on the order of the PEV population, while the ideal valley filling requires a number that is on the order of time slots (as it solves the aggregate charge at each time slot). Curves 510 and 512 in FIG. 5 show charging profile from global valley filling with unconstrained and constrained power, respectively. Implementations of the present application, the optimal solution of the constrained valley filling, Equations (1), (2), and (4), is considered the reference profile. For simplicity, the constrained valley filling will be referred to as valley filing in the rest of the present application.

3. PROTOCOL OF INDIVIDUAL PEV CHARGING AND COST SIGNAL UPDATING

Although the charging profile of individual PEVs is relatively small compared to the grid load, the aggregated charging profile of the PEVs is of great importance to consider. In a decentralized scheme, every PEV makes the best decision for its own in terms of the overall electricity and cost available to it. This section introduces the mechanism of optimal charging for single PEVs (e.g., action 206 in flowchart 200) as well as the protocol to update the cost signal (e.g., action 210 in flowchart 200) broadcast by the grid operator to achieve the optimality at the grid scale, to the extent possible (given the constraint on PEV availability). Thereafter, a one-day result is shown at different updating frequencies. Then, the communication effort is evaluated to verify the feasibility of the present protocol. Finally, the year-long results is demonstrated and compared to the original net load and the results from valley filling formatted in the previous section.

3.1 Individual PEV Charging

Given charging vehicle demand (e.g., energy), charging constraints (e.g., plugged in time window and charging power limits), and charging cost (e.g., price of electricity, as provided by the grid operator), each PEV may determine the optimal way to charge such that its individual cost can be minimized, as shown below.

Problem Formulation

1. Decision Variables:
The SOC increase (or electricity recharged) of the PEV n for each time slot $t_i$ given by $x_n(t_i)$.

2. Cost Function:
The summation of the total charging cost is given by:

$$\sum_i C(t_i) \times x_n(t_i) \quad (5)$$

where $C(t_i)$ is the cost per kWh (DC) during the time $t_i$, derived from the electricity cost provided by grid operator.

3. Constraints:
1) The total energy charges during the home dwelling period should match the consumed energy during the day (known and fixed):

$$\sum_i x_n(t_i) = b_n \quad (6)$$

2) The lower bound on $x_n(t_i)$ is zero and for the upper bound, it is the product of the charging power at home $p_n(t_i)$ (3.3 kW), plugged in time for charging in each time slot $\overline{\Delta t_n(t_i)}$, and charging efficiency $\eta$ (e.g., 0.85).

$$0 \leq x_n(t_i) \leq r_n(t_i) = p_n(t_i) \times \overline{\Delta t_n(t_i)} \times \eta \quad (7)$$

If a PEV arrives home at 17:30 and leaves at 7:45 next day, and the time slot duration $\Delta t$ is 1 hour (60 minutes), then the plugged in time for charging from 17:00 to 18:00, $\overline{\Delta t_n(t_{18})}$, is 0.5 and the plugged in time for charging from 7:00 to 8:00 in the next day, $\overline{\Delta t_n(t_{32})}$, is 0.75.

4. Assumptions on the variables:
1) The span of plugged in time for each vehicle is fixed by the NTHS data. That is, each PEV controller knows the time for the first trip the next day.
2) The electricity cost is not exactly the same in any two time intervals, i.e., $C(t_i)$ values are distinct.
3) The charging power and AC to DC efficiency are assumed to be a constant and known.

3.1.1. Charging Profile

The key is the cost signal (e.g., the price) made available to each PEV. At specific instants (e.g., every 30 minutes or after every 10,000 cars have registered for the night), the grid operator sends the recently arrived vehicles a price profile $C(t_i)$. In the present implementation, $C(t_i)$ is the electricity net load (i.e. demand minus renewable) $D(t_\perp i)$. In other implementations, the cost signal may have different values at different times.

Since the cost signal for a specific time slot may be different than any other, optimizing the cost function in Equation (5) above may choose the lowest point to charge and then jump to the second lowest one with the maximum charging power until the SOC reaches 100%. As such, partial rate charging can be avoided. Indeed, there can be at most one partial charge time period, which means the charging stops partly through that period (e.g., 15 minutes into the a 60 minute period). The detailed proof is shown in Proof Section 3.1.1.A below:

Begin Proof Section 3.1.1.A

The main properties of the optimization algorithm in Equations (5) (7) are presented. Each PEV may minimize its costs associated the following cost function.

$$\Sigma C(t_i)x(t_i)$$

subject to $$\begin{cases} \sum x(t_i) = b \\ x(t_i) \geq 0 \\ x(t_i) \leq r(t_i) \end{cases}$$

The Lagrangian is $$\mathcal{L} = C^T x - v(\Sigma x(t_i) - b) - \lambda^T x + \mu^T(x - r)$$

Applying the standard approach, KTT condition (which are both necessary and sufficient due to convexity)

$$\frac{\partial \mathcal{L}}{\partial x} = C(t_i) - v - \lambda(t_i) + \mu(t_i) = 0$$

$$v\left(\sum x(t_i) - b\right) = 0$$

$$\lambda(t_i)x(t_i) = 0$$

$$\mu(t_i)(x(t_i) - r(t_i)) = 0$$

From $$\lambda(t_i)x(t_i) = 0 \rightarrow \lambda(t_i) = 0 \text{ or } x(t_i) = 0$$

Here, the charging time is considered. Hence, $$x(t_i) \neq 0$$

Then $$\lambda(t_i) = 0$$

Then the KTT conditions become to $$\begin{cases} C(t_i) - v + \mu(t_i) = 0 \\ v\left(\sum x(t_i) - b\right) = 0 \\ \mu(t_i)(x(t_i) - r(t_i)) = 0 \end{cases}$$

If $$\mu(t_i) \neq 0 \rightarrow x(t_i) = r(t_i)$$

i.e., charging at maximum power. If $$\mu(t_i) = 0 \rightarrow x(t_i) \text{ can be different than } r(t_i) \text{ but } C(t_i) = v$$

So the KTT condition shows either $x(t_i)=r(t_i)$, or $C(t_i)=v$.

If $C(t_i)$'s are distinct, then $\mu(t_i)=0$ is possible for one time slot only, since there is only one v.

This shows that all other $x(t_i)$'s are at maximum value with possible exception of 1.

Assuming distinct prices for each time slot, the algorithm above picks the lowest cost time slots. Furthermore, the partial time slot has the highest price among time slots used (but lower than those not used).

The following notation are used for the charging and non-charging time slots, respectively $$I_c = \{j | x(t_i) \neq 0\}$$

$$I_{nc} = \{j' | x(t_i) = 0\}$$

From the main property of the optimization in Equations (6)-(8), for all $j \in I_c$, $x(t_j)=r(t_j)$ except at most one; i.e., maximum charge in all time slots with at most one partial charge.

Now assume there exists some $j' \in I_{nc}$ such that $C(t_j) < C(t_k)$ for some $k \in I_c$; i.e., one of the time slots with no charge has lower price than at least one of the charging times slots. Then consider the following:

$$C(t_j)\varepsilon + C(t_k)x(t_k) - \varepsilon) = [C(t_j) - C(t_k)]\varepsilon + C(t_k)x(t_k) < C(t_k)x(t_k)$$

i.e., shifting the charging to the $t_j$, time slot reduces the cost, which is not possible as it contradicts the optimality of the solution. This shows the optimized solution picks the lowest cost time slots.

For the last part of the claim, following the same logic: suppose $t_j$ was associated with partial charging, i.e., $x(t_j) < r(t_j)$. Suppose there exist $t_k$ such that $C(t_j) < C(t_k)$ and $x(t_k)=r(t_k)$. Clearly, there exists $\varepsilon > 0$ small enough such that $$\begin{cases} 0 < x(t_j) + \varepsilon \leq r(t_j) \\ 0 \leq x(t_k) - \varepsilon < r(t_k) \end{cases}$$

Similar to above, it is noted that $$C(t_j)(x(t_j)+\varepsilon)+C(t_k)x(t_k)-\varepsilon)=[C(t_j)-C(t_k)]\varepsilon+C(t_j)x(t_j)+C(t_k)x(t_k)<C(t_j)x(t_j)+C(t_k)x(t_k)$$

which means shifting from $t_k$ to $t_j$ reduces the cost, which contradicts optimality of the solution, implying that $C(t_j) > C(t_k)$ for all $\{k \neq j | k \in I_c\}$.

End Proof Section 3.1.1.A

Figure 6A:
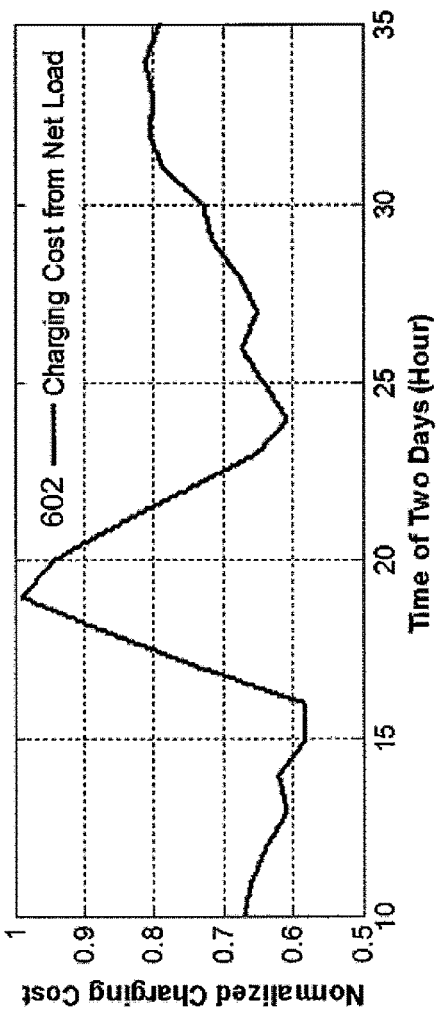
FIGS. 6A and 6B respectively illustrate a cost signal and charging profiles for two PEVs with different energy requirements and plug-in windows based on the cost signal, according to one implementation of the present application.
Figure 6B:
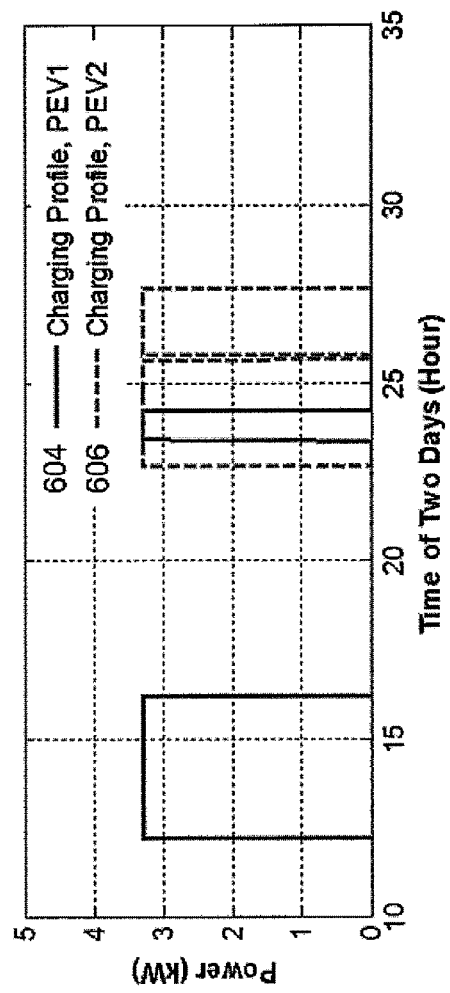

FIGS. 6A and 6B respectively illustrate a cost signal and charging profiles for two PEVs with different energy requirements and plug-in windows based on the cost signal, according to one implementation of the present application. In FIG. 6A, cost signal 602 shows the charging cost between hour 10 to hour 35 based on the net load from day 98 to day 99 in FIG. 5, for example. FIG. 6B shows charging profile 604 of PEV1 and charging profile 606 of PEV2, where PEV1 and PEV2 may having different energy requirements and plug-in windows. PEV1 and PEV2 both receive cost signal 602 as shown in FIG. 6A, for example. PEV1 and PEV2 arrive home at 5:15 and 16:40, respectively. PEV 1 decides to charge from 12:00 to 16:00 and late in the evening to guarantee full charge. For PEV 2, since the lowest cost available occurs overnight, it decides to charge then with charging turned off for about 10 minutes, due to the small bump in cost signal 602 around 3 a.m. in FIG. 6A. It is noted that the present implementation does not prevent intermittent charging profiles, which can happen if the apparent cost to the PEV has multiple local (and similar in depth) peaks and valleys.

The intermittent charging is considered to be a milder charging condition compared to continuous charging. By intermittent charging, battery temperature can be lowered to reduce the impact on degradation, since temperature may be one of the leading factors for degradation. Similarly, intermittent charging may allow the converter and other electronics to cool down. In another implementation, when continuous charging is desirable, an alternative algorithm can be the following: 1), each PEV calculates its required charging time at arrival; 2), depending on the departure time in the next day, the PEV finds out all the feasible continuous charging windows (i.e. charging starting points); 3), according to the cost signal broadcast, the PEV does a simple line search to determine the optimal charging window (i.e. charging starting point). Assuming a continuous window that accommodates the needed charge exists, the above algorithm leads to a continuous block. It is noted that, in the present implementation, communication between grid operator and each PEV is quite modest: a cost signal (e.g., one set of prices for charging) from the grid operator to the PEV, and a charging profile (e.g., one set of charging values) from each PEV to the grid operator, once each direction (i.e., a single exchange of information) to avoid iterative communication until convergence between each PEV and the grid operator.

3.2. Cost Function and Signal Updating

Given that individual PEVs choose the lowest cost periods, the question becomes how to control/update the cost function such that the aggregated charging profile can be close to the optimum for grid operation. As shown in the previous section, a basic approach would be based on a cost $C(t_i)$, where the original net load curve $D(t_i)$ can be used as the cost directly. In one implementation for cost updating, the grid operator may provide a demand profile (e.g., $D(t_i)$) to reflect a forecasted net load of electricity use.

Figure 7:
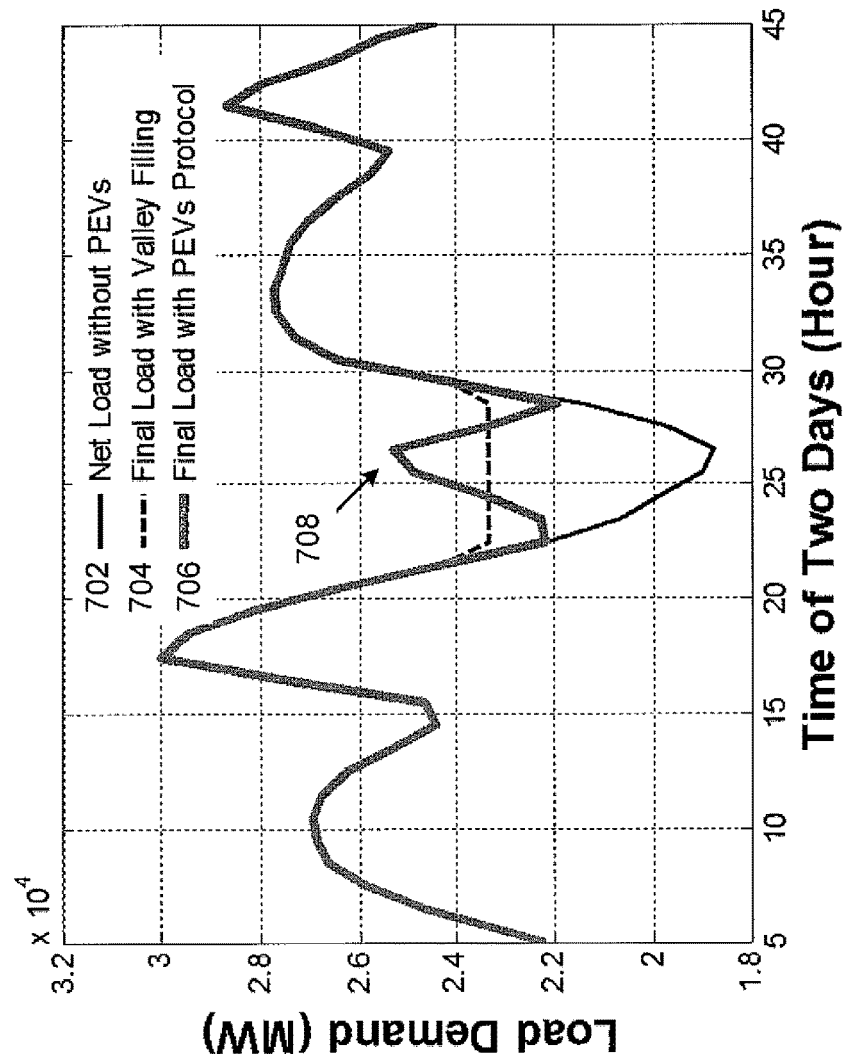
FIG. 7 illustrates results of updating a cost signal every 24 hours with a total population of PHEV40 (40 miles all electric range), according to one implementation of the present application.

FIG. 7 illustrates results of updating a cost signal every 24 hours with a total population of PHEV40 (40 miles all electric range), according to one implementation of the present application. In the present implementation, since the cost signal is updated daily, all PEVs registered within the same 24-hour window respond to the same cost signal, thus receiving the same cost signal. For example, curve 702 shows net load without PEVs, where curve 702 includes an overnight valley approximately between hour 22 and hour 29. Curve 704 shows final load with valley filling (e.g., targeted final load). Curve 706 shows final load with PEVs protocol.

As shown in FIG. 7, curve 706 exhibits peak 708 at approximately hour 26, where curve 702 has its minima. The incremental load is over 7 GW and lasts a short time. Peak 708 on curve 706 is a result of all of the PEVs receiving the same cost signal within the 24-hour window, thereby all picking hour 26 for charging, when the cost according to curve 702 is the lowest. Peak 708 on curve 706 may expose a significant extra burden on the grid, thus undesirable.

As shown in FIG. 3, the PEVs arrival time is well distributed, so the new peak, peak 708, may be built up through a relatively long time (more than half day) by the individual decisions made at different times. A solution to lower this large peak, peak 708, is for the grid operator to change the cost signal periodically so that PEVs gradually fill the valleys in the updated cost signal and avoid charging at new peaks, such as peak 708. This process can be treated as a natural valley filling.

Given that a 3.3 kW maximum load for one PEV is relatively very small compared to the entire grid load, the updating of the cost can be accomplished such that a number of vehicles can register, obtain cost signals, select charging times and communicate the results to the grid operator. A typical time interval $T_{step}$, or a set number of PEVs $V_{step}$, or a set amount of the net load change in a time window (e.g., 23:00 to 6:00 in the next day) can be used to trigger the updating. Below, details and results of the present protocol are shown based on the first two methods.

1. Updating the Cost Function

At each updating instant, the cost function is updated by adding the aggregated PEV charging profiles to the previous cost function.

$$C_k(t_i) = C_{k-1}(t_i) + s_{k-1}(t_i), \quad C_0(t_i) = D(t_i) \qquad (8)$$

2. Profile aggregating

As discussed before, the mechanism for updating a cost signal may be at set time internals or at set number of vehicles.

a. If fixed time interval is chosen, all of the individual profiles, generated from the PEVs that have arrival time, $ta_n$, in the interval $[T]_{k-1}, T_k)$ are aggregated.

$$s_{k-1}(t_i) = \sum_n \frac{x_n(t_i)}{\eta} \forall n \text{ subject to } T_{k-1} \leq ta_n < T_k \qquad (9)$$

$$T_k = T_{k-1} + T_{step}, \quad T_0 = 4am \qquad (10)$$

b. If the fixed PEVs amount is chosen, each aggregation takes place with the interval of vehicle number $[V]_{k-1}, V_k)$.

$$s_{k-1}(t_i) = \sum_n \frac{x_n(t_i)}{\eta} \forall n \text{ subject to } V_{k-1} < n < V_k \qquad (11)$$

$$V_k = V_{k-1} + V_{step}, \quad V_0 = 0 \qquad (12)$$

In either case, it is important to limit the number of PEVs aggregated between two cost broadcasts such that the load increment is small enough to accomplish smoothing of the overall load profile. This can be precisely controlled by $T_{step}$ or $V_{step}$. In section 3.3, a comparison between more frequent (more communication) and less frequent (less smooth load profile) updates is discussed.

3.3. Protocol Results and Analysis

3.3.1. One-Day Results

Figure 8:
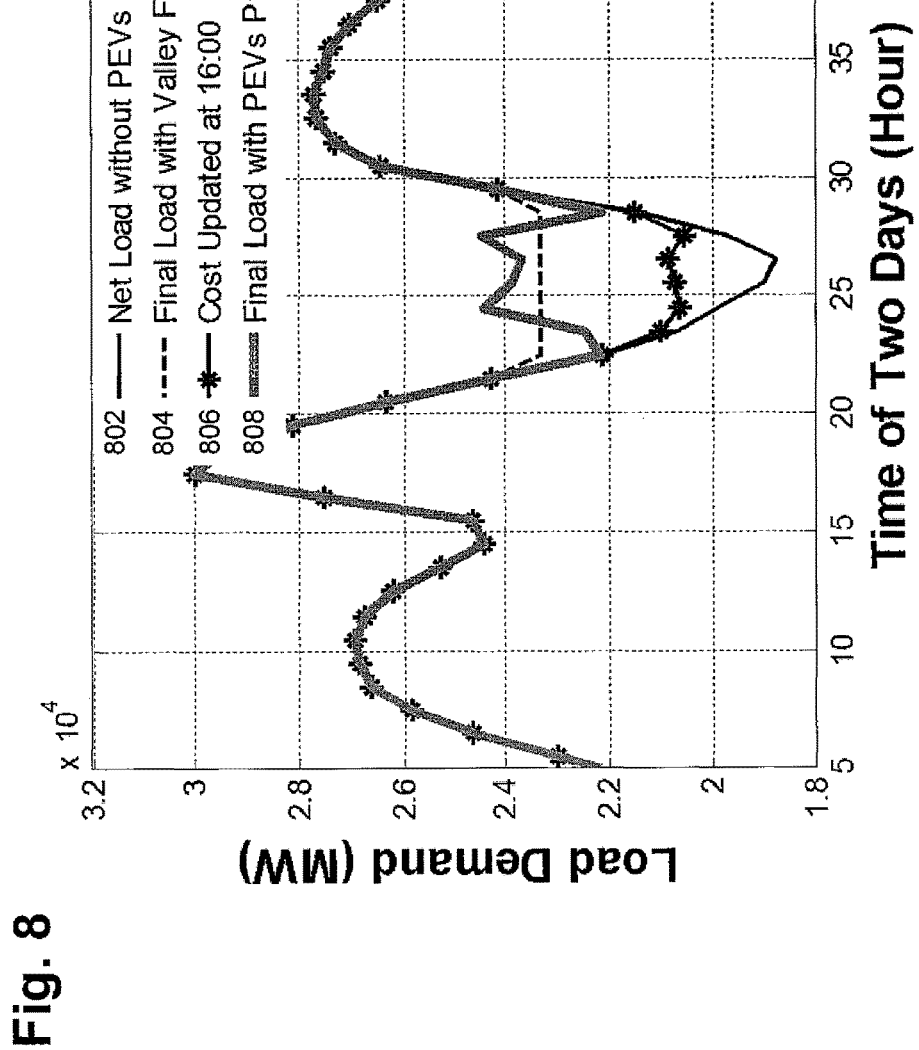
FIG. 8 illustrates results of updating a cost signal every 12 hours and the costs updated at each time, according to one implementation of the present application.

FIG. 8 illustrates results of updating a cost signal every 12 hours, with $T_{step}$ being 720 minutes (12 hours), and the costs updated at each time, according to one implementation of the present application. FIG. 8 includes curve 802 showing net load without PEVs, curve 804 showing final load with valley filling, curve 806 showing cost updated at hour 16:00, and curve final load with PEVs protocol. The increment of the net load can be divided into two parts by curve 806, the one before hour 16:00 and the one after. For example, curve 806 shows the broadcast cost at hour 16:00, which shows the predicted power use by the PEVs (e.g., what had registered/reserved by all the PEVs up to hour 16:00). As can be seen in FIG. 8, curve 808 has the same trend as curve 706 observed in FIG. 7. Curve 808 fills the two valleys as depicted on curve 806, and includes two smaller peaks corresponding to the times at which the two valleys depicted in curve 806 occur.

Figure 9A:
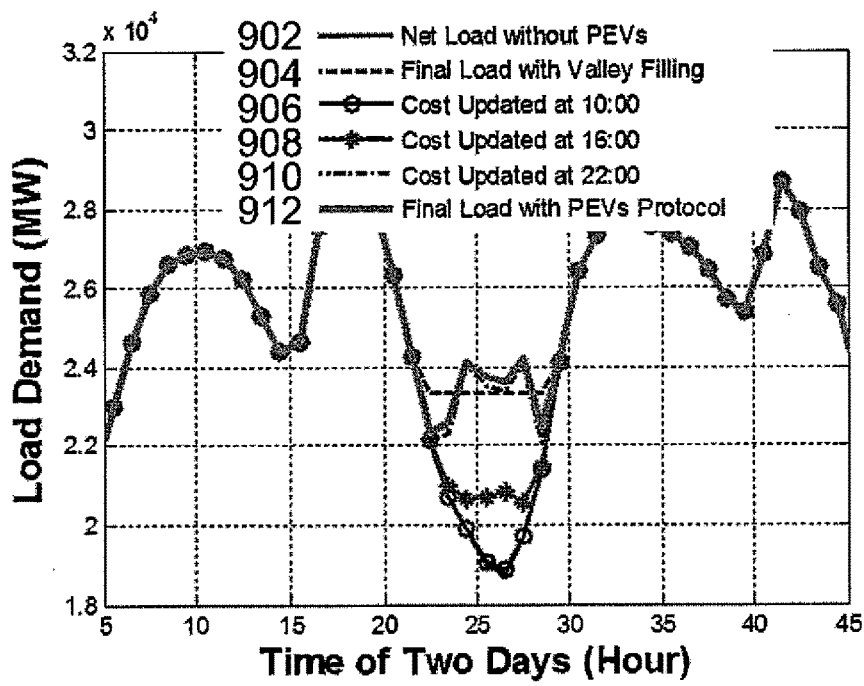
FIGS. 9A and 9B illustrate results of updating a cost signal every 6 hours and every 4 hours, respectively, and the costs updated at each time, according to implementations of the present application.
Figure 9B:
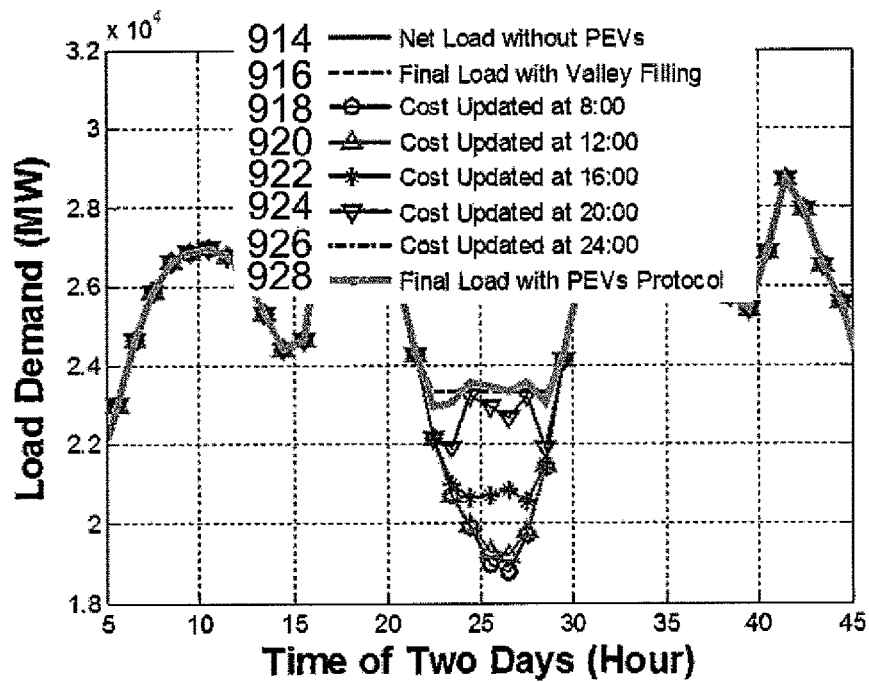

FIGS. 9A and 9B illustrate results of updating a cost signal every 6 hours and every 4 hours, respectively, where $T_{step}$ are 360 and 240 minutes (6 hours and 4 hours) respectively, and the costs updated at each time, according to implementations of the present application. In particular, FIG. 9A includes curve 902 showing net load without PEVs, curve 904 showing final load with valley filling, curve 906 showing cost updated at 10:00, curve 908 showing cost updated at 16:00, curve 910 showing cost updated at 22:00, and curve 912 showing final load with PEVs protocol. Similarly, FIG. 9B includes curve 914 showing net load without PEVs, curve 916 showing final load with valley filling, curve 918 showing cost updated at 8:00, curve 920 showing cost updated at 12:00, curve 922 showing cost updated at 16:00, curve 924 showing cost updated at 20:00, curve 926 showing cost updated at 24:00, and curve 928 showing final load with PEVs protocol. For example, each of curves 918 through 926 shows the broadcast cost at the time indicated, which shows the predicted power use by the PEVs (e.g., what had registered/reserved by all the PEVs up to then).

It is noted that curve 928 showing final net load with PEV protocol is smoother than curve 912 showing final net load with PEV protocol, with a decreased $T_{step}$. Also, the difference between two costs $C_k(t_i)-C_{k-1}(t_i)$ is small at the beginning which gets larger and eventually gets small again. This pattern is due to the distribution of the vehicle arrival times in FIG. 3. With the same time interval, fewer PEVs arrive home in the morning and the late evening while more PEVs arrive home in the late afternoon and early evening. This the reason why the curves indicating costs are denser at the bottom and top, and less dense (i.e. larger change in each step) in the middle. Near the end of the process, e.g., very late evening, fewer PEV arrivals help smooth the demand curve.

Figures 10A, 10B:
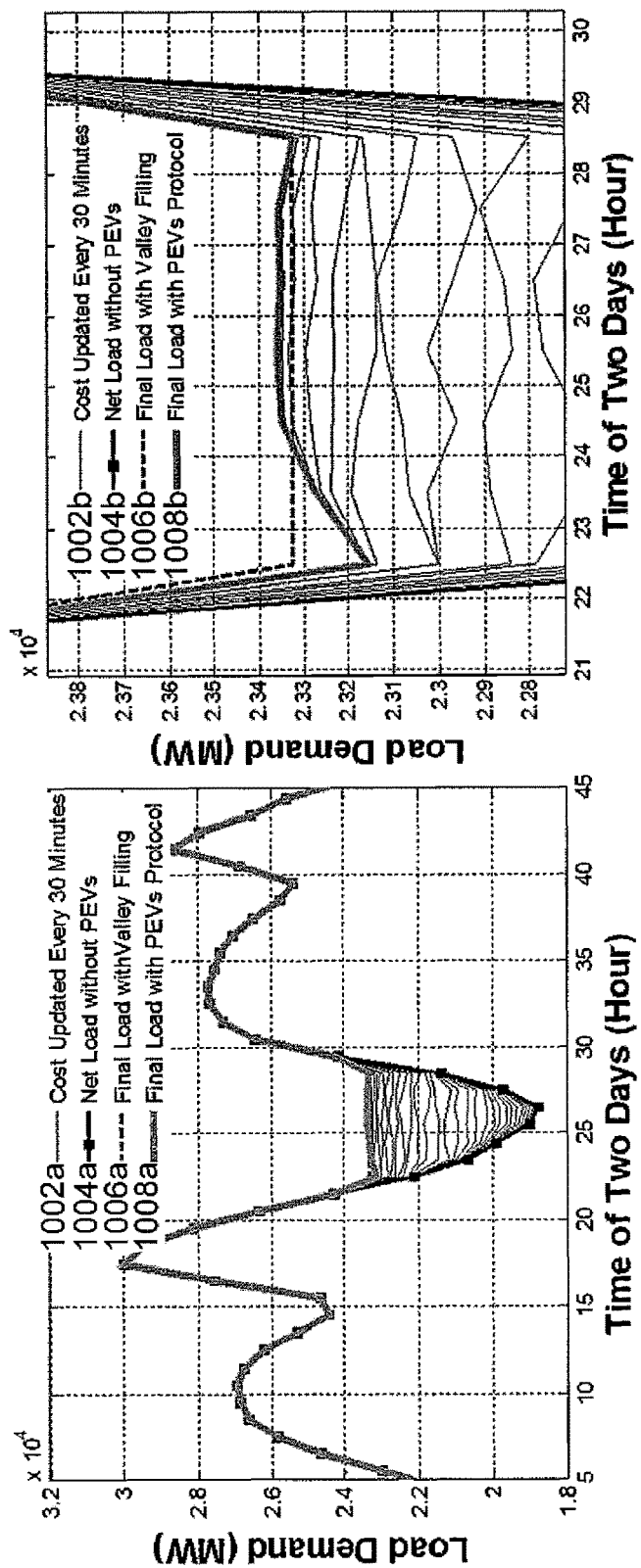
FIGS. 10A and 10B illustrate results of updating a cost signal every half an hour, and the costs updated at each time, according to one implementation of the present application.

FIGS. 10A and 10B illustrate results of updating a cost signal every half an hour, where $T_{step}$ is 30 minutes, and the costs updated at each time, according to one implementation of the present application. In particular, as shown in FIG. 10A, curve 1008a showing final load with PEVs protocol is substantially flat between hour 23:00 and hour 28:00, and follows very closely to curve 1006a showing final load with valley filling. Curves 1002b, 1004b, 1006b and 1008b in FIG. 10B are enlarged portions of curves 1002a, 1004a, 10006a and 1008a in FIG. 10A, respectively. A detailed examination of FIG. 10B indicates the variation of curve 1008b is less than 200 MW from hour 23:00 to hour 28:00. As such, generators, especially load followers, can have a more steady operating condition overnight. It is also noted that, the creation and later filling of new peaks and valleys in curves 1002b, where the cost signal is updated every 30 minutes in successive steps. For example, all PEVs arrived between 16:00 and 16:30 are given the same cost signal. These PEVs optimize their own cost, e.g., picking a charging profile where the cost is lowest. After updating, the new cost signal, would be higher at those time slots. As a result, PEVs arriving between 16:30 and 17:00 are given the new cost signal, and would try to avoid charging at those time slots.

Figures 11A, 11B:
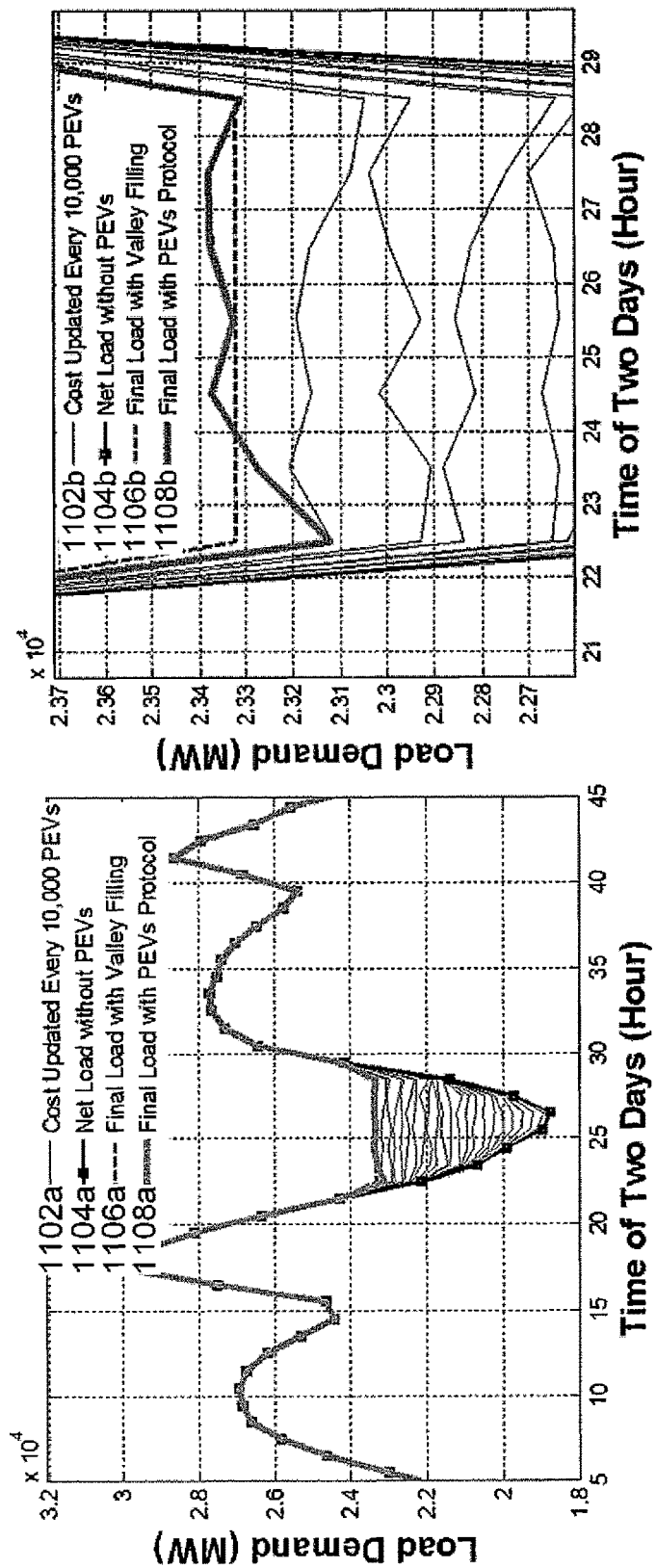
FIGS. 11A and 11B illustrate results of updating of a cost signal at a set number of PEVs, and the costs updated at each time, according to one implementation of the present application.

FIGS. 11A and 11B illustrate results of updating of a cost signal at a set number of PEVs (e.g., updating the cost signal every 10,000 PHEVs), and the costs updated at each time, according to one implementation of the present application. Because the charging power is fixed to be 3.3 kW, the maximum change between $C_k(t_i)$ and $C_{k-1}(t_i)$ is limited by the product of charging power and the PEVs number $V_{step}$. In this approach, the grid operator may develop a queue, as PEVs arrive, and after each $V_{step}$ vehicles, the cost signal is updated and shared with the next $V_{step}$ vehicles. In the present implementation, $V_{step}$ is set to be 100,000, such that the maximum change on the cost can be limited to 330 MW step by step. FIGS. 11A and 11B show the results in comparison with the results of updating the cost signal at set time intervals in FIGS. 10A and 10B. As shown in FIGS. 11A and 11B, curves 1108a and 1108b show final load with PEVs protocol having a final variation within a 250 MW window from hour 23:00 to hour 28:00. The cost function increment is more consistent and limited by 300 MW as shown in the analysis above.

Figures 12A, 12B:
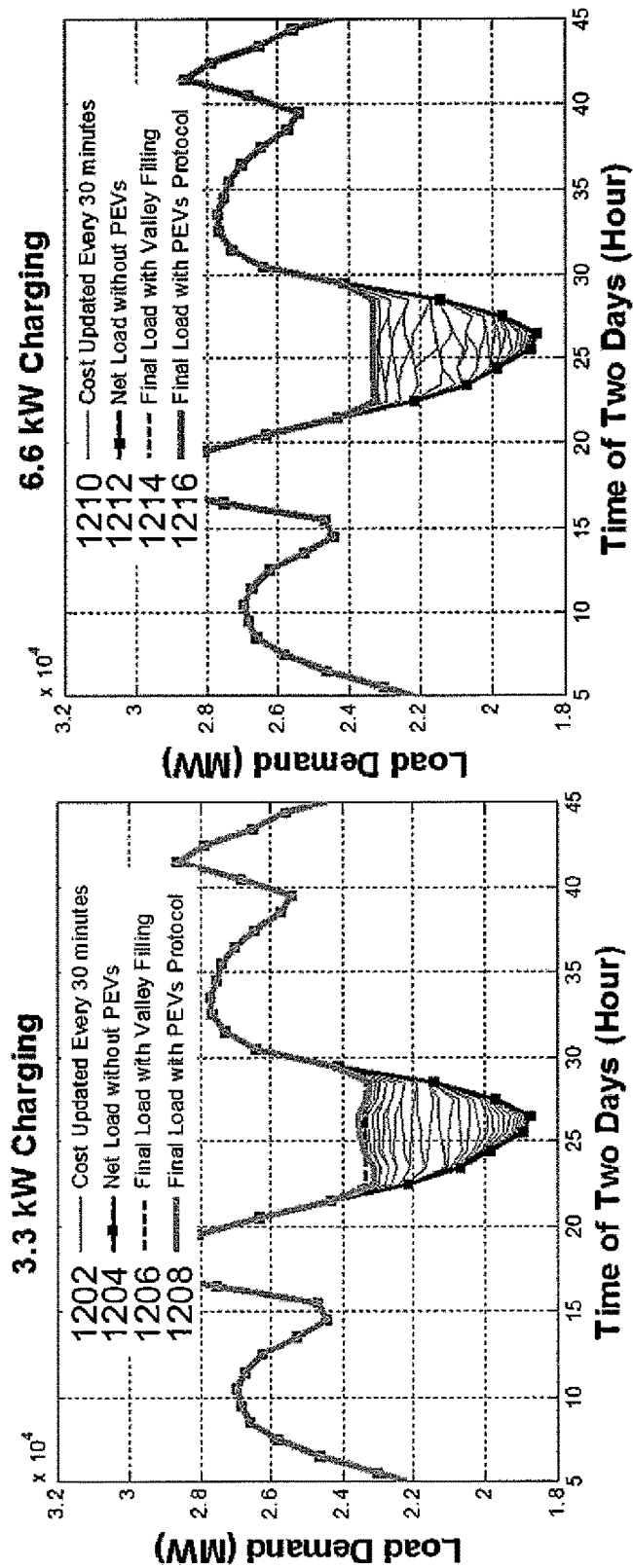
FIGS. 12A and 12B illustrate results of continuous charging with a cost signal updated every 30 minutes for 3.3 kW and 6.6 kW charging powers, respectively, and the costs updated at each time, according to implementations of the present application.

As discussed earlier, continuous charging can also be guaranteed by changing the algorithm to a line search of the charging start point for individual PEVs. The rest of the protocol can remain the same where costs are updated by $T_{step}$ or $V_{step}$. FIGS. 12A and 12B illustrate results of continuous charging with a cost signal updated every 30 minutes for 3.3 kW and 6.6 kW charging powers, respectively, and the costs updated at each time, according to implementations of the present application. In particular, FIG. 12A includes, with 3.3 kW charging power, curve 1202 showing cost updated every 30 minutes, curve 1204 showing net load without PEVs, curve 1206 showing final load with valley filling, and curve 1208 showing final load with PEVs protocol. As shown in FIG. 12A, curve 1208 for final net load with PEVs protocol is smooth, though not as flat as the one with intermittent charging in curve 1008a in FIG. 10A. There exists a bump in the middle of the overnight valley. This is due to the fact that the average charging time is over 3 hours, for 3.3 kW power. Forcing continuous charging inevitably leads to a sizable number if PEVs having overlapping charging time, resulting in the shape seen in FIG. 12A. Higher charging power would mitigate this issue. FIG. 12B includes, with 6.6 kW charging power, curve 1210 showing cost updated every 30 minutes, curve 1212 showing net load without PEVs, curve 1214 showing final load with valley filling, and curve 1216 showing final load with PEVs protocol. As shown in FIG. 12B, curve 1216 for final load with PEVs protocol is as flat as the intermittent 3.3 kW charging of curves 1008a in FIG. 10A.

3.3.2. Communication Effort

According to the present inventive concepts, either intermittent or continuous charging, each PEV receives a cost signal (e.g., a load curve), calculates its charging profile, and transmits the results one time, while a grid operator receive the individual charging profiles before updating the cost signal. Thus, the calculation effort is decentralized to individual PEVs while the receiving and aggregating efforts are on the grid operator, proportional to the PEVs population N. In Table 2, the amount of individual charging profiles received in a step and the frequency that the cost is updated are evaluated at the largest communication burden. To obtain the results shown in FIG. 10A, the cost is updated 48 times per day and no more than 167,000 PEV profiles are transmitted in 30 minutes. As for the results in FIG. 11, the minimum updating interval is 18 minutes.

TABLE 2

One-day communication effort of the PEVs protocol.

| Result type | Update method | Max arrival (PEVs per 15 minutes) | Min time interval to update (minute) | Max PEVs aggregated in one update | Update times per day |
|---|---|---|---|---|---|
| Analytical | Fixed time ($T_{step}$) | 4% × N | $T_{step}$ | 4% × N/15 × $T_{step}$ | 1440/$T_{step}$ |
| (N, population) | Fixed PEVs ($V_{step}$) | 4% × N | $V_{step}$/(4% × N/15) | $V_{step}$ | N/$V_{step}$ |
| Example ($T_{step}$ = 30 min | Fixed time ($T_{step}$) | 84000 | 30 | 167,000 | 48 |
| $V_{step}$ = 100,000 N =2.1 million) | Fixed PEVs ($V_{step}$) | 84000 | 18 | 100,000 | 21 |

Thus, in the present implementation, the calculation and communication efforts offer advantages as: 1) one linear optimization calculated and one profile transmitted at the PEV side without any global information; 2) no more than 10% of profiles are aggregated in 30 minutes at the operator side; 3) the cost signal is updated no more than 50 times per day at the grid operator side; 4) further, PEVs do not have to wait until a specific time to participate, which increases the potential to change the net load in late morning and afternoon.

3.3.3 Annual Results

Figure 13:
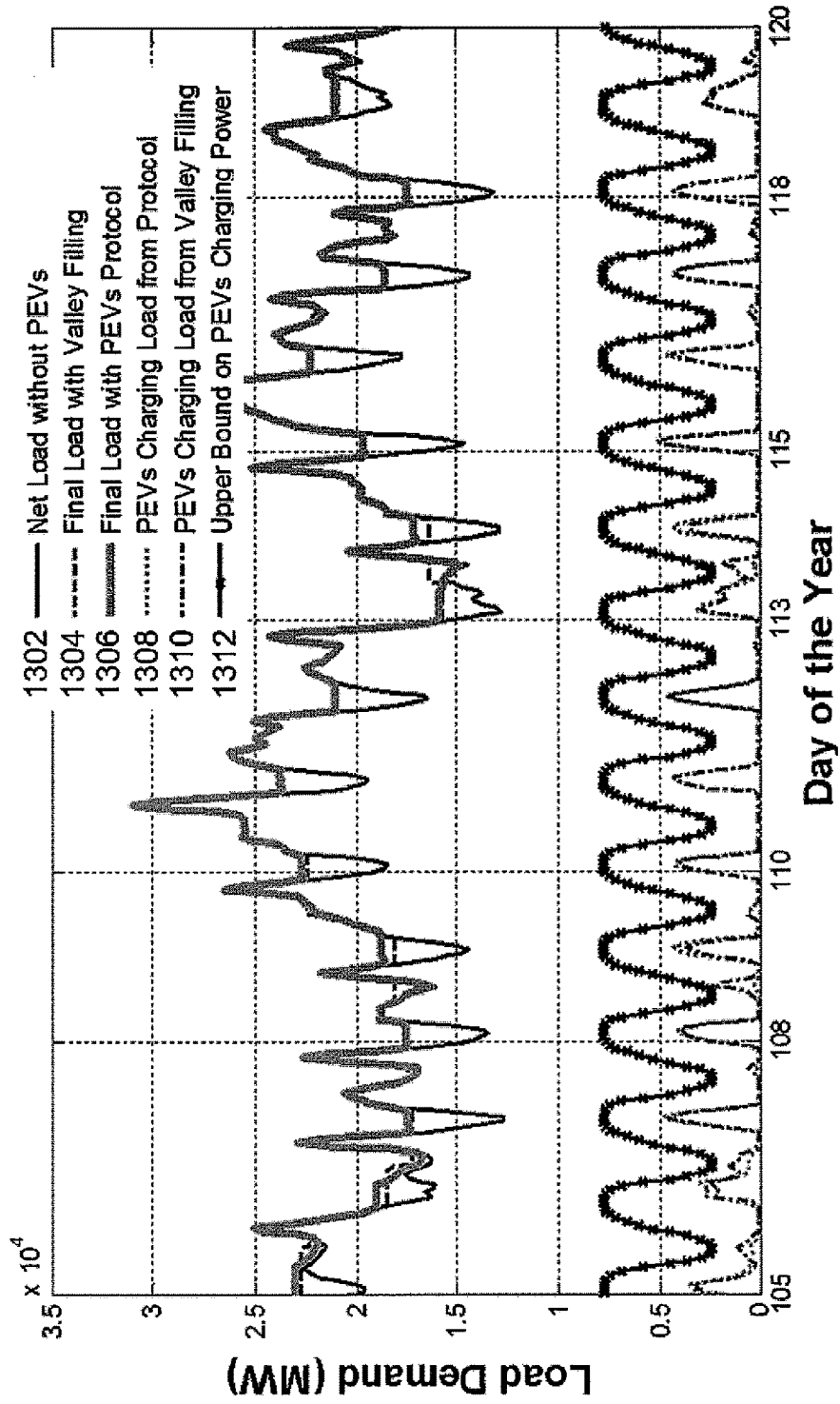
FIG. 13 illustrates a portion of the annual results from valley filling and a protocol with 30-minute cost signal updating interval, according to one implementation of the present application.

FIG. 13 illustrates a portion of the annual results (i.e. between day 105 and day 120) of different net load curves, curves 1302, 1301, 1306, 1308, 1310, and 1312, where the same PEV charging requirements repeated each day with 30 minutes for $T_{step}$ has been implemented in the simulations for the whole year, according to one implementation of the present application. The charging profiles from two methods are depicted at the bottom by curve 1308 and curve 1310. Curve 1312 shows the upper bound of the charging power, and curves 1304 and curve 1306 show final load with valley filling and PEVs protocol, respectively. Curves 1308 and 1310 show two charging profiles of valley filling and protocol, respectively, which are very close to each other especially when there is only one deep valley overnight. The correlation coefficient of the two profiles is 0.98 and the two resulting final loads exhibit less than 0.02% difference on the objective function in Equation (1). A difference occurs when there is another relatively deep valley in the afternoon as shown in the results from day 108 to day 109 or day 113 to day 114. In that case, the valley filling provides a result with two valleys filled up close to the same level while the PEVs protocol may not fill the first valley in the afternoon and fills the overnight valley to a higher level. The main reason for that is the overnight valley is relatively deep, leading to a smaller cost function value so that PEVs participating in the protocol at the early steps would choose to charge overnight. When it is filled to a higher level than the afternoon, time has passed the first valley and the rest of the PEVs can still only choose overnight to charge. It is noted that none of the existing research has addressed this since they require that most PEVs arrived home to initiate the protocol, often quite late in the day, e.g. midnight. Naturally, it is difficult to fill the afternoon valley in practice. However, as discussed in Section 4 below, in one implementation of the present application, a final net load curve (e.g., the valley filling results) is chosen as a target load to approach and prioritize the afternoon valley by modifying the cost function.

Figure 14:
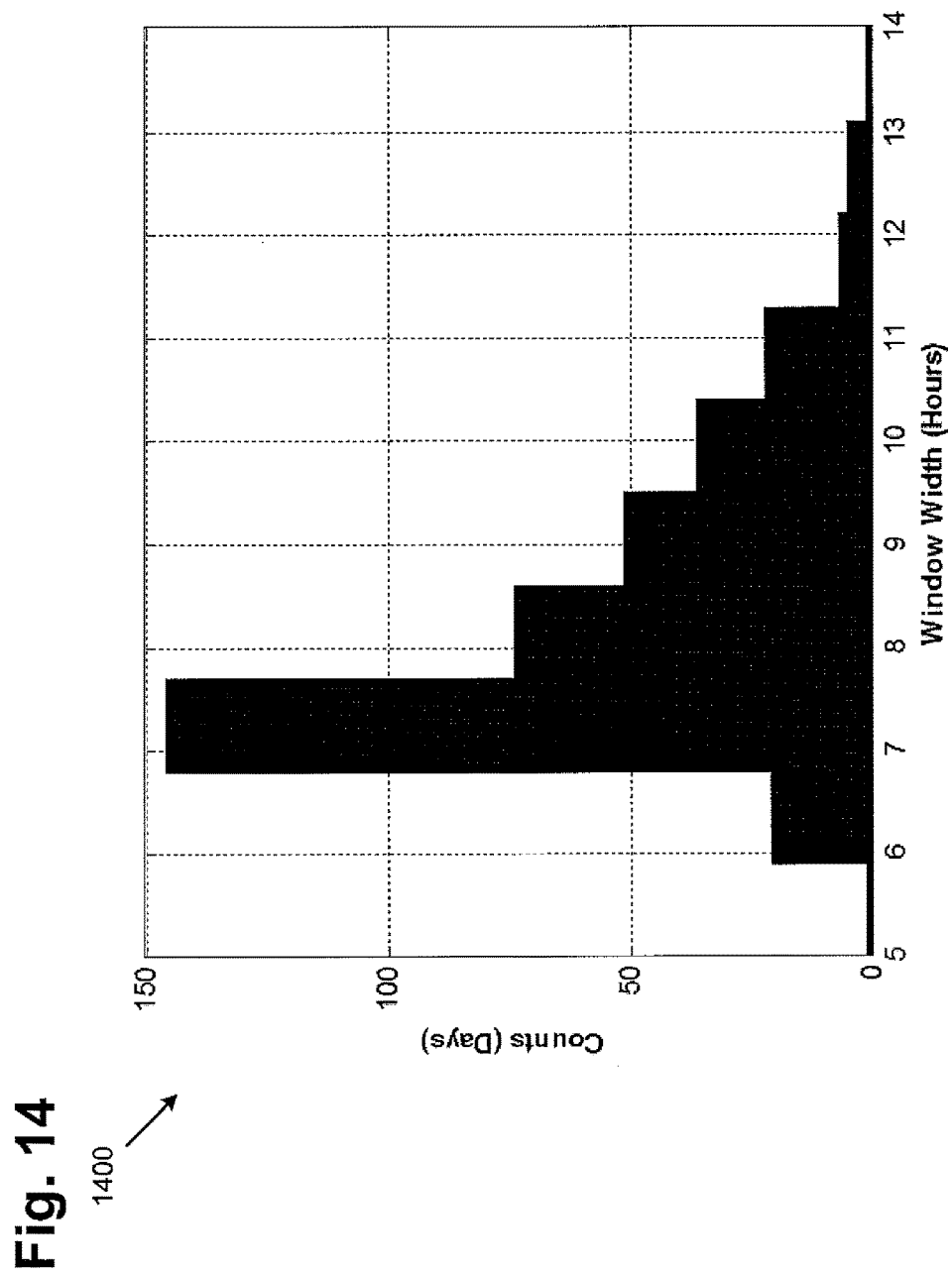
FIG. 14 illustrates a histogram of the maximum consecutive time with final net load varying less than 300 MW, according to one implementation of the present application.

FIG. 14 illustrates a histogram of the maximum consecutive time with final net load varying less than 300 MW, according to one implementation of the present application. In FIG. 14, the maximum variation of the final load curve is set as 300 MW, for example. The length of the consecutive time window that meets this bound is found for every night of the year. This window indicates for how long the balancing generators can operate at a relatively constant condition. Histogram 1400 is the distribution of the width of this time window by setting the maximum variation to 300 MW. For most of the nights, the window width is above 7 to 8 hours and there is only one night with a 5-hour window and 21 days with a 6-hour window. The widest window reaches up to 13 to 14 hours. The widely spread distribution is due to the variety of the original net loads for different nights, shown in FIG. 13. A narrower and deeper net load valley tends to have a shorter consecutive time of flat net demand as shown on day 118 in FIG. 13, while a wider valley is likely to have a longer consecutive time of flat demand as shown on day 119 in FIG. 13. According to the present inventive concepts, each PEV calculates its own optimal profile based on the broadcast cost signal, which is updated frequently. The charging load of PEVs can fill the overnight valley, often to a flat final net load curve.

4. MODIFIED PROTOCOL FOR TARGET LOAD FOLLOWING

When there exists a relatively large valley (or multiple valleys) in the afternoon due to large solar/wind generation (or intermittent solar/wind generation), it may lead a scenario, in which power plants have to ramp up and down quickly to meet this particular load, increasing cost and generating more emissions or, alternatively, some of the solar/wind power is curtailed. It is therefore preferable to fill or smooth the afternoon valley(s).

Figure 15:
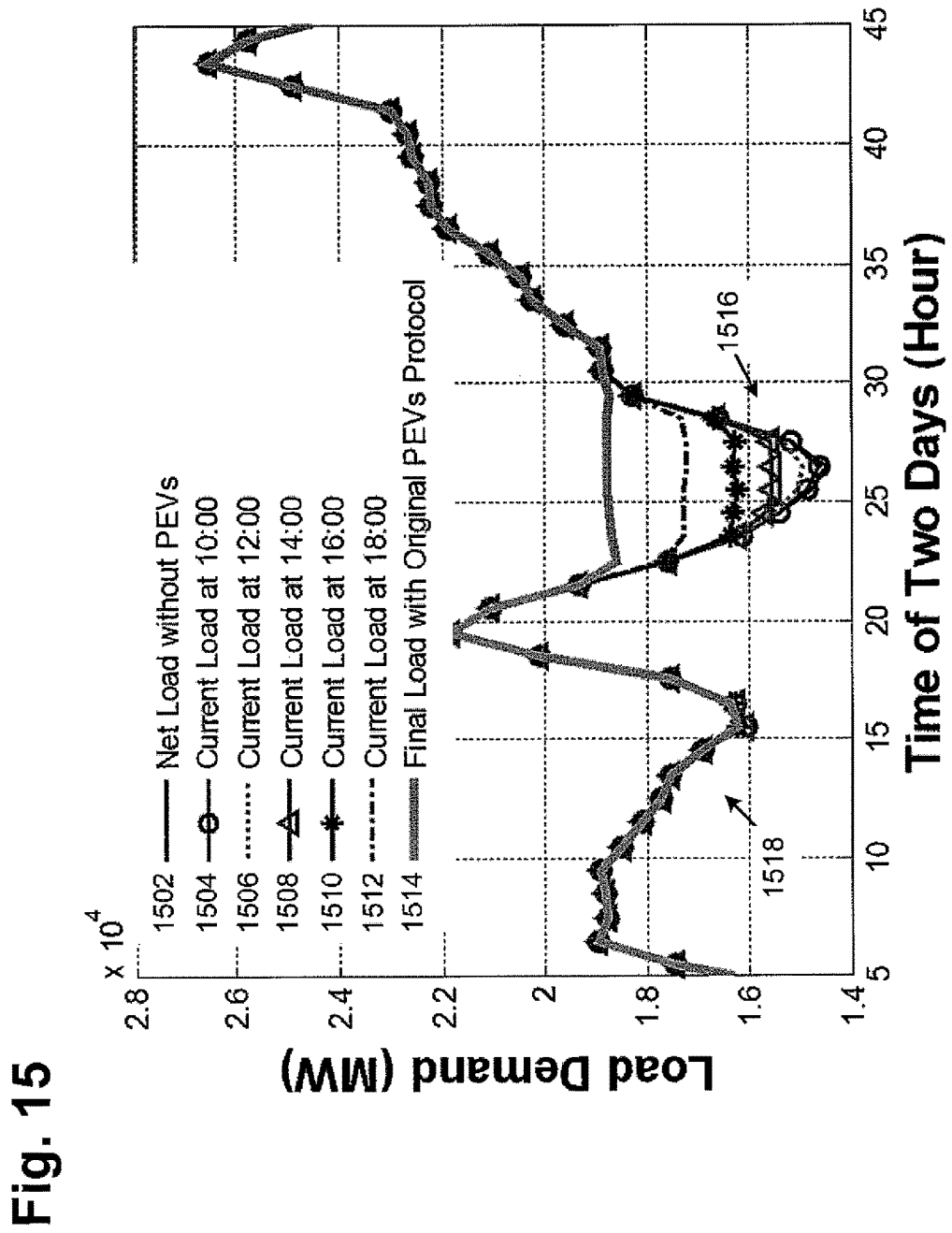
FIG. 15 illustrates results of updating a cost signal every 6 hours, according to one implementation of the present application.

FIG. 15 illustrates results of updating a cost signal every 6 hours, according to one implementation of the present application. As shown in FIG. 15, curves 1502, 1504, 1506, 1508, 1510, 1512 and 1514 may correspond to curves 902, 904, 906, 908, 910, 912 and 914 in FIG. 9. Curve 1502 for net load without PEVs shows primary valley 1516 around hour 26:00 and secondary valley 1518 approximately between hour 15:00 and hour 16:00. As shown in FIG. 15, curve 1514 showing final load with original valley filling protocol does not fill secondary valley 1518 at all. As discussed in the Section 3.3.3. (Annual Results), this is because overnight valley, such as primary valley 1516, is more attractive or cheaper than secondary valley 1518 in afternoon at the beginning. By the time primary valley 1516 is filled to the same level as secondary valley 1518, it might be too late for enough PEVs to fill secondary valley 1518. In order to fill a target load, such as secondary valley 1518, here a modified protocol may be used: 1) grid operators define a target load by considering constraints at the grid level; 2) the cost broadcast is changed to be the current load minus the target load; 3) when appropriate, scaling is used to adjust the new cost function to ensure the desired overall charging profile. The local optimizations of individual PEVs along with the communication scheme remain the same as before. These actions are described in detail below, followed by daily results.

4.1. Modified Protocol

According to a modified protocol, for the first action, a target load curve with PEVs charging, $TL(t_i)$ is the summation of the net load and the overall PEV charging load $X(t_i)$, which is unknown but bounded according to Equation (2) and inequality Equation (4).

$$TL(t_i) = D(t_i) + X(t_i) \qquad (13)$$

$$\text{subject to} \begin{cases} \Delta t \times \sum_i X(t_i) = B = \sum_n b_n \\ X(t_i) \leq R(t_i) \end{cases}$$

Figure 16:
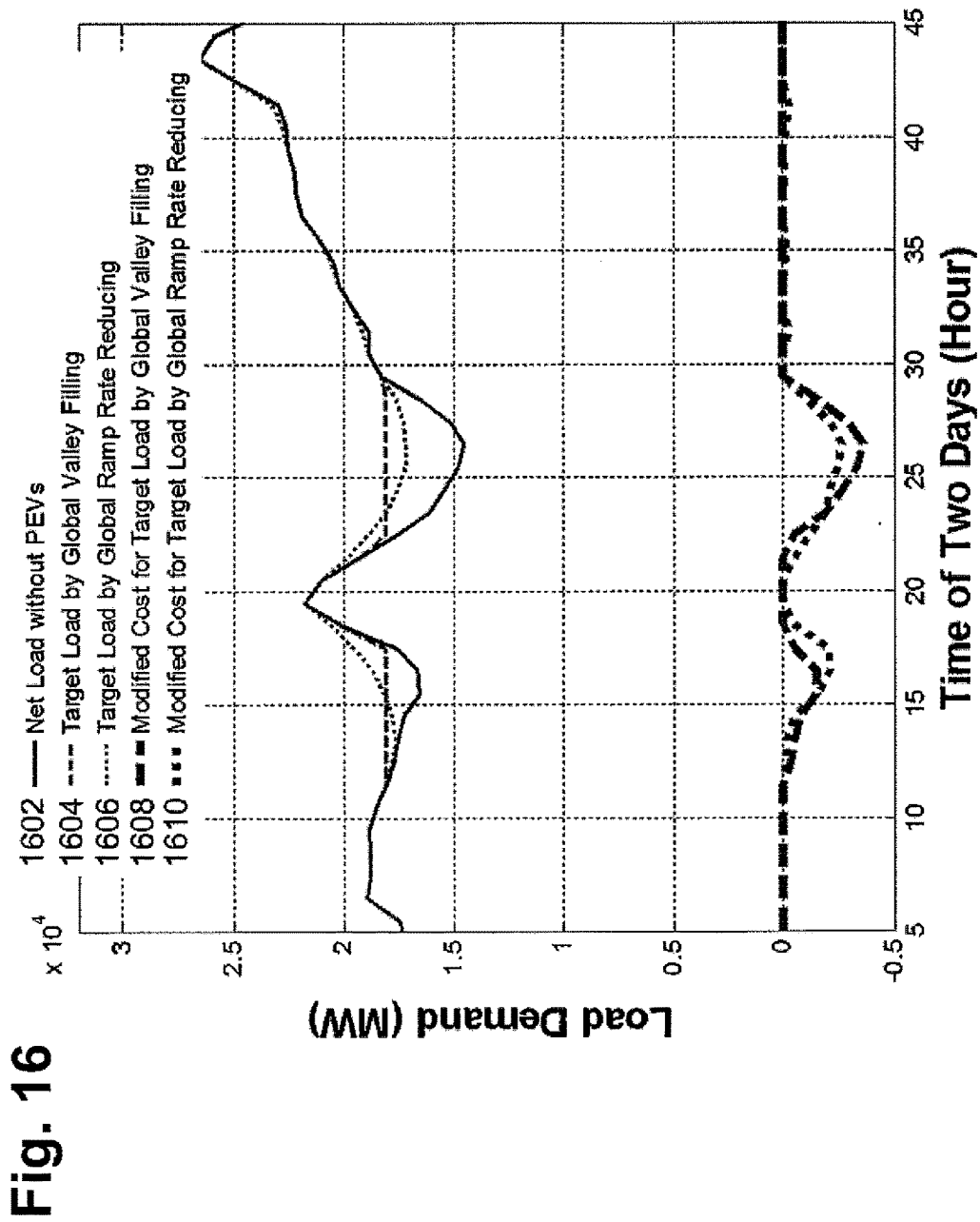
FIG. 16 illustrates two examples of target loads, according to implementations of the present application.

FIG. 16 illustrates two examples of the target load, with the first example being a solution of valley filling and the second example being a solution of ramp rate reducing, according to implementations of the present application. The first example for the target load is to use the solution for valley filling, formed by Equations (1), (2), and (4). The solution is depicted by curve 1604 in FIG. 16. The second example for the target load is the solution for ramp rate reduction, which is aimed at smoothing the final load for generation cost reduction. In the present application, the objective function for ramp rate reduction is shown in Equation (14), which minimizes the sum of squares of ramp rates between two consecutive time slots. The total energy and maximum power constraints associated with $X(t_i)$, in Equations (2) and (4), remain the same. The ramp rate problem of Equations (14), (2), and (4), is also a convex optimization problem and solvers, such as CVX and Quadratic Programming in MATLAB, can provide a solution fast and reliably. The solution to this problem is depicted by curve 1606 in FIG. 16.

$$\min \sum_i (TL(t_{i+1}) - TL(t_i))^2 = \qquad (14)$$

$$\min \sum_i ((D(t_{i+1}) + X(t_{i+1})) - (D(t_i) + X(t_i)))^2$$

subject to $$\begin{cases} \Delta t \times \sum_i X(t_i) = B = \sum_n b_n \\ X(t_i) \leq R(t_i) \end{cases}$$

For the second action, at each time or vehicle interval, based on the target load for ramp rate reduction, the cost function is modified by subtracting the target load from the cost function defined in Section 3.2. (i.e., the costs shown in FIGS. 10A, 10B, 11A, and 11B). This modification, see Equation (15), results in a cost function that is essentially the gap between the current load and the target load. The demand profile is updated by receiving and aggregating PEV charging profiles $s_k(t_i)$ in each step exactly the same way as before while the target load is fixed. FIG. 16 also shows the initial modified cost functions for the two target loads when no PEV has arrived.

$$TC_k(t_i) = C_k(t_i) - TL(t_i)$$

$$C_k(t_i) C_{k-1}(t_i) + s_{k-1}(t_i) \; C_0(t_i) = D(t_i) \qquad (15)$$

Generally, the modified cost function, such as curves 1608 and 1610 in FIG. 16, can be non-positive if the current load is less than the target level. The wider this gap in some time slots, the more attractive it is for the PEVs to charge. By the analysis shown in Proof Section 3.1.1. A above, the PEVs may choose the lowest cost periods, which leads initially to late night time slots due to the largest gap between the two curves. As joining PEVs select these time slots, the gap becomes small and the magnitude reaches the same as the ones in the afternoon, the PEVs may then choose to charge at the first gap. However, by then there might not be enough PEVs available to fill the first gap, as the results show in FIG. 17.

Figure 17:
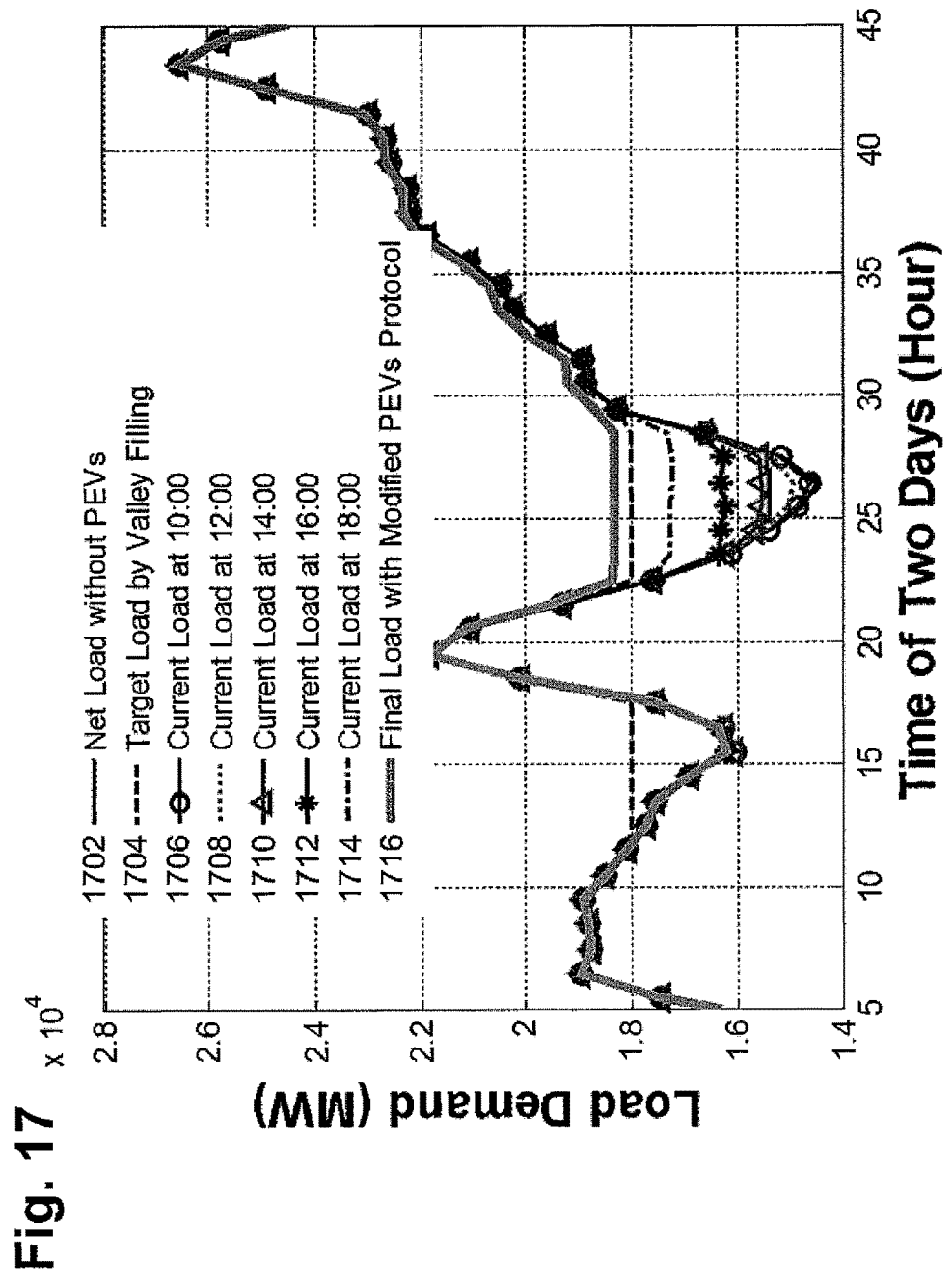
FIG. 17 illustrates results from a modified protocol without prioritizing by using a valley filling solution as a target load, according to one implementation of the present application.

FIG. 17 illustrates results from a modified protocol without prioritizing by using a valley filling solution as a target load, according to one implementation of the present application. In FIG. 17, curves 1702, 1704, 1706, 1708, 1710, 1712, and 1714 may correspond to curves 1502, 1504, 1506, 1508, 1510, 1512, and 1514 in FIG. 15. As shown in FIG. 17, without prioritizing, curve 1716 does not fill the secondary valley in the afternoon, for the same reason that the original protocol is not able to fill secondary valley 1518 in FIG. 15. Thus, an additional modification to the cost signal may be needed to guarantee the secondary gap (e.g., afternoon gap) is filled first.

For the third action, in order to prioritize the afternoon time slots, $\Gamma$, the grid operator can artificially scale the costs to be more attractive than those overnight. Equation (16) shows the formulation of the modified cost $PC_k(t_i)$, which may be broadcast to PEVs, along with some requirements.

$$PC_k(t_i) = TC_k(t_i) P(t_i)$$

$$P(t_i) = 1 \; \forall t_i \notin \Gamma, P(t_i) > 1 \; \forall t_i \in \Gamma$$

$$[PC]_k(t_i) < [PC]_k(t_j) \forall [[TC]_k(t_i) < 0, t_i \in \Gamma, t_j \notin \Gamma$$

$(\mathbb{I}PC\mathbb{I}_{\downarrow}k(t_{\downarrow}i)<\mathbb{I}PC\mathbb{I}_{\downarrow}k(t_{\downarrow}(i+1)))\forall$
$\{\mathbb{I}TC\mathbb{I}_{\downarrow}k(t_{\downarrow}i)<0,t_{\downarrow}i\in\Gamma,t_{\downarrow}(i+1)\in\Gamma$ The scaling vector, $P(t_i)$, has to be larger than one when $t_i$ belongs to $\Gamma$, the time slots that are to be prioritized, which are hour 11:00 to hour 18:00 in the example; it can be equal to one for the rest of the time slots. Second, from hour 11:00 to hour 18:00, the scaling values need to be greater than the ratio between the depth of the overnight gap and the depth of the afternoon gap, such that the secondary valley (e.g., the afternoon gap) is filled first. The scalar needs to be large enough that it produces lower costs in that window, even as the afternoon gap is partially filled. Third, for the first gap, from hour 11:00 to hour 18:00, the same problem discussed earlier can exist, that early PEVs may fill the deepest point, at around hour 15:00, and only then the rest of the gap. When the number of PEVs is small, there is a possibility that sufficient PEVs are not available to fill the early part of the gap. $P(t_i)$, therefore, should ensure the modified function $PC_k(t_i)$ has a more negative value for the earlier time slots in the prioritized window $\Gamma$. In other words, $PC_k(t)$ has to have a positive slope in terms of $t_i$ if the target has not been reached. The last line in Equation (16) is the condition required to guarantee that the gap at the earlier time slots can be filled first by the PEVs. The precise values of $P(t_i)$ were manually tuned here, through a few trials, having the value on the order of 10E6 for hour 11:00 and 10E3 for hour 18:00, and gradually decreasing exponentially.

4.2. Results and Analysis

In this section, two sets of final results are shown. First, following the above example in FIG. 17, the solution of valley filling is used as the target load. Second, the same modified protocol is applied on the other target, the solution of ramp rate reducing.

4.2.1. Prioritized Valley Filling as Target Load

Figure 18:
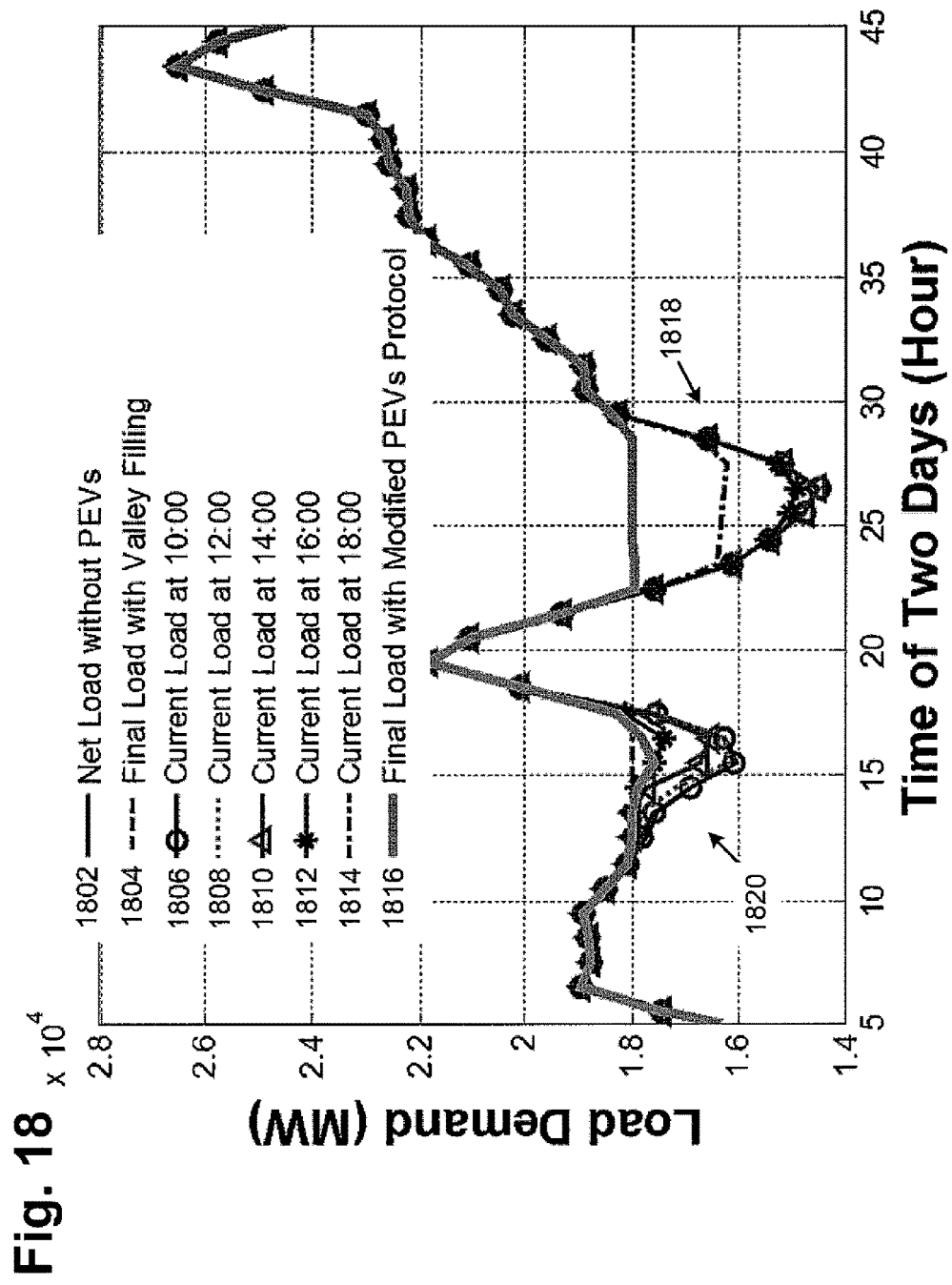
FIG. 18 illustrates results from a modified protocol with time slots hour 11:00 to hour 18:00 prioritized by using a valley filling solution as a target load, according to one implementation of the present application.

FIG. 18 illustrates results from a modified protocol with time slots hour 11:00 to hour 18:00 prioritized by using a valley filling solution as a target load, according to one implementation of the present application. FIG. 18 includes curves 1802, 1804, 1806, 1808, 1810, 1812, 1814, and 1816. In particular, curve 1816 shows the final load from the modified protocol with hour 11:00 to hour 18:00 prioritized. Due to the prioritizing, the gap in the small valleys is more negative than those of overnight valley, steering early arriving PEVs to toward the smaller valleys. As these are filled, or their different with the target becomes small, the updated cost function directs the PEVs to the overnight valley. As shown in FIG. 18, with the modified protocol with time slots hour 11:00 to hour 18:00 prioritized by using valley filling as a target load, curve 1816 substantially fills primary valley 1818 and secondary valley 1820.

4.2.2. Ramp Rate Reducing as Target Load

Figure 19A:
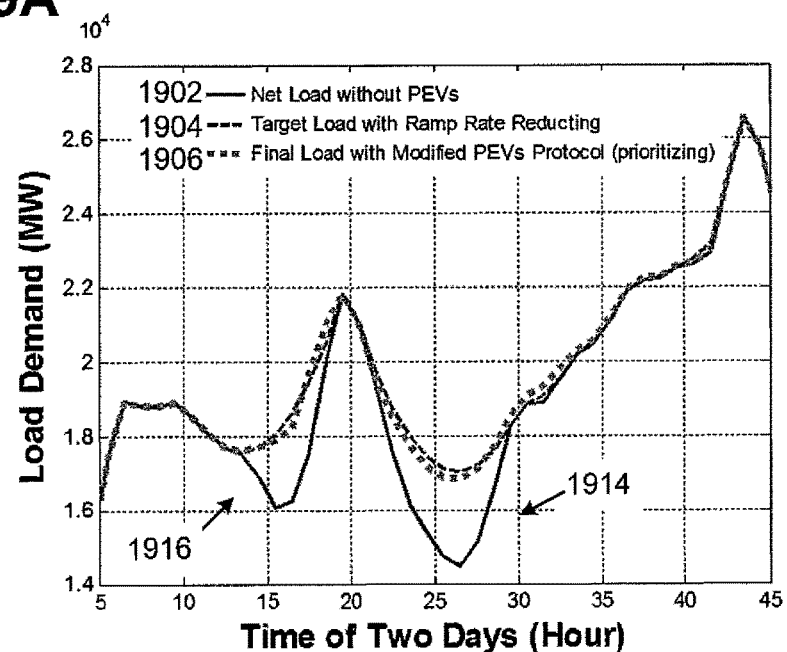
FIGS. 19A and 19B illustrate two sets of results from a modified protocol with time slots 11:00 to 18:00 prioritized by using a solution for ramp rate reducing as a target load, according to one implementation of the present application.
Figure 19B:
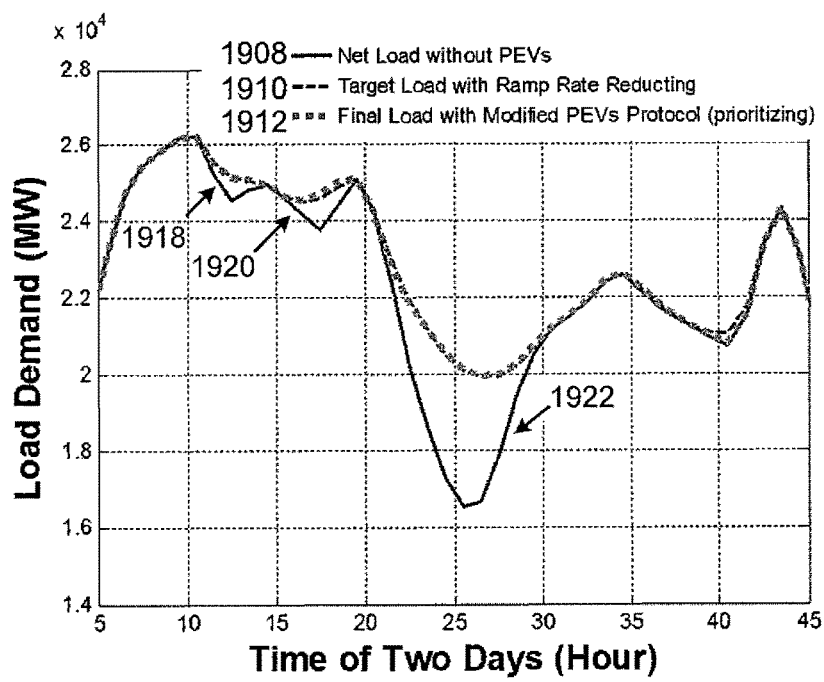

FIGS. 19A and 19B illustrate two sets of results from a modified protocol with time slots 11:00 to 18:00 prioritized by using a solution for ramp rate reducing as a target load, according to one implementation of the present application. In FIGS. 19A and 19B, two 48-hour net loads (e.g., curves 1902 and 1908) are shown, with FIG. 19A being the same as in the previous example and FIG. 19B having multiple small valleys throughout the day. As illustrated in FIG. 19A, in addition to primary valley 1914, secondary valley 1916 is quite substantial, approximately between hour 13:00 and hour 17:00, which implies substantial solar/wind generation during the day time. In FIG. 19B, in addition to primary valley 1922, two small secondary valleys 1918 and 1920 are shown between hour 10:00 and 20:00, which also indicate varying solar/wind generation. Compared to the example above, only the target load is changed in order to have the minimum ramp rate. The final loads with modified PEV protocol follow the target loads very well. For example, in FIG. 19A, the maximum difference between final load and the target load is 200 MW with only one exception at the time slot from 15:00 to 16:00. That difference is around 400 MW. In FIG. 19B, the difference between final load and the target load is examined to be smaller than 200 MW for all time slots.

Thus, by slightly changing the cost signal broadcast and prioritizing the time slots during the day time, the final load with PEVs can be controlled to follow a target load. To form an achievable target load, a grid operator needs to estimate the overall charging energy in Equation (2), maximum charging power at each time slot in Equation (4), and other possible constraints. This modified protocol extended the capability of PEVs to change the grid load from valley filling to target load following. Alternatively, valley filling is one way of selecting a target load.

5. DISCUSSION

The results presented in the present application may lead to intermittent charging. There is little evidence that intermittent charging is undesirable, indeed the avoidance of excess heating due to continuous charging over a long period, could be an important benefit. Nevertheless, when continuous charging is desirable, individual PEVs can first estimate the required charging time and then perform a line search to understand the optimal starting point such that charging cost can be minimized. The rest of the protocol for cost updating may remain the same. For the overnight valley filling, this may show a very similar result compared to intermittent charging, but have a small bump in the middle of the valley. But, when charging power is doubled to 6.6 kW, the flat valley filling overnight can also be achieved.

The actual charging power for a specific PEV depends on its SOC. Generally, the maximum constant charging power is sustained before the SOC reaches 80%~90% and lower charging power is applied until fully charged. In the present application, the algorithm for calculating individual charging profile does not need to consider the SOC dependent charging profile, but assumes maximum power can be applied all the time. However, a minor change on the algorithm can accomplish different charging profiles. For continuous charging, PEVs can estimate the SOC dependent charging profile, implement the line search to determine the charging starting point, and send back this profile. For intermittent charging, PEVs can overestimate the charging energy, implement the linear optimization to determine charging profile with constant power, tailor the end of the charging profile as the battery specifies, and send back the final profile. For the grid operator, the protocol to aggregate PEV profiles and update the cost function does not change at D.

6. CONCLUSIONS

In the present application, electric demand from CAISO for year 2005 and solar and wind power under 30% renewable penetration assumptions are used to generate the net load profile for the state of California. The 2009 National Household Travel Survey data and parameterized PEVs operating and charging model were used to simulate the charging demand and constraints with 2.1 million PEVs (10% penetration). Optimization on the aggregated profile was formed in terms of valley filling and ramp rate reducing. Optimization on individual PEV charging was formed, as well, for the objective of minimizing charging cost. Two methods on cost function/signal updating were performed along with results for both daily and annual basis.

At the demonstrated renewable penetration, the net load curve shows the biggest valley almost every night. The most effective time for charging is the window from 20:00 to 7:00 in the next day, corresponding to the availability of 80% of the total number of vehicles. With significant PEV market penetration (10%) shown in present application, coordination between individual PEVs and the grid has to be made to avoid additional and prohibitively expensive peak power periods. Using grid load directly as the cost function and updating it frequently enough, by either a fixed time interval or vehicle amount, can lead to a flat final net load overnight for a relatively large time window. Updating the cost signal every 30 minutes results in less than 300 MW variations on the final load during more than 7 hours, for 90% of the days in a year. Also, the correlation of the aggregated charging loads from grid level valley filling and the PEVs protocol is greater than 0.98.

The computation and communication efforts required by implementations of the present application are more modest than the conventional techniques which require, potentially a large number of, iterations. Each PEV needs to compute its charge profile only once, performing a simple linear optimization problem. It also needs to send the charging profile back to the grid operator, where individual profiles are aggregated and loads are updated periodically. Using the gap between the current load and final target load as the modified cost function and prioritizing the earlier time slots, a desired target net load can be achieved similar to overnight valley filling.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A system for optimizing electricity use from an electric grid, said system comprising:
 a grid operator configured to formulate a target load using a cost function for said electric grid;
 said grid operator configured to broadcast a cost signal to a first chargeable electric device based on said target load;
 a server in said grid operator receiving a charging profile for charging said first chargeable electric device from said first chargeable electric device, said charging profile determined by said first chargeable electric device based on said cost signal, wherein said charging profile includes at most one partial time period during which charging stops partly through said one partial time period;
 an aggregator in said grid operator aggregating a demand profile for said electricity use based on said charging profile;
 said grid operator configured to determine an updated cost signal based on said demand profile;
 said grid operator configured to broadcast said updated cost signal to a second chargeable electric device, but not to said first chargeable electric device;
 said system further comprising a means for plugging said first chargeable electric device into said electric grid;
 said grid operator further configured to control charging of said first chargeable electric device based on said charging profile.

2. The system of claim 1, further comprising another means for plugging said second chargeable electric device into said electric grid.

3. The system of claim 1, wherein said first chargeable electric device is a plug-in electric vehicle (PEV).

4. The system of claim 1, wherein said target load is configured by said grid operator to fill a primary electricity demand valley.

5. The system of claim 1, wherein said target load is configured by said grid operator to fill a secondary electricity demand valley.

6. The system of claim 1, wherein said target load is configured by said grid operator to reduce a ramp rate for said electric grid.

7. The system of claim 1, wherein said first chargeable electric device determines said charging profile only once based on said cost signal.

8. The system of claim 1, wherein said system is configured to charge said first chargeable electric device at a maximum charging rate.

9. The system of claim 1, wherein said grid operator is configured to determine said updated cost signal at set time intervals.

10. The system of claim 1, wherein said grid operator is configured to determine said updated cost signal for a set number of registered electric devices.

11. A method of optimizing electricity use from an electric grid, said method comprising:
 formulating a target load using a cost function for said electric grid;
 broadcasting a cost signal to a first chargeable electric device based on said target load;
 receiving a charging profile for charging said first chargeable electric device from said first chargeable electric device, said charging profile determined by said first chargeable electric device based on said cost signal, wherein said charging profile includes at most one partial time period during which charging stops partly through said one partial time period;
 aggregating a demand profile for said electricity use based on said charging profile;
 determining an updated cost signal based on said demand profile;
 broadcasting said updated cost signal to a second chargeable electric device but not to said first chargeable electric device;
 controlling charging of said first chargeable electric device based on said charging profile.

12. The method of claim 11, further comprising plugging in said first chargeable electric device to said electric grid prior to said formulating said target load.

13. The method of claim 11, wherein said first chargeable electric device is a plug-in electric vehicle (PEV).

14. The method of claim 11, wherein said first chargeable electric device determines said charging profile only once based on said cost signal to avoid iterative communication between said first chargeable electric device and said grid operator.

15. The method of claim 11, further comprising said target load filling a primary electricity demand valley.

16. The method of claim 11, further comprising said target load filling a secondary electricity demand valley.

17. The method of claim 11, wherein said determining said updated cost signal is performed at set time intervals.

18. The method of claim 11, wherein said determining said updated cost signal is performed for a set number of registered electric devices.

19. The method of claim 11, wherein said target load is configured to reduce a ramp rate for said electric grid.

20. The method of claim 11, further comprising charging said first chargeable electric device at a maximum charging rate.

* * * * *